US007216065B2

(12) United States Patent
Natsume et al.

(10) Patent No.: US 7,216,065 B2
(45) Date of Patent: *May 8, 2007

(54) REFLECTING SURFACE DESIGN SYSTEM, REFLECTING SURFACE DESIGN METHOD, RECORDING MEDIUM, AND COMPUTER PROGRAM

(75) Inventors: Kazunori Natsume, Shimizu (JP); Masahiro Maeda, Shimizu (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 700 days.

This patent is subject to a terminal disclaimer.

(21) Appl. No.: 10/292,472

(22) Filed: Nov. 13, 2002

(65) Prior Publication Data

US 2003/0101032 A1 May 29, 2003

(30) Foreign Application Priority Data

Nov. 27, 2001 (JP) ............................. P2001-361144

(51) Int. Cl.
*G06F 17/50* (2006.01)
(52) U.S. Cl. ................. 703/1; 362/346; 362/297; 362/518; 362/612; 359/868; 359/622; 359/626; 359/858; 356/612; 356/601; 356/624
(58) Field of Classification Search .............. 352/10; 362/245; 359/858, 846; 345/582, 418; 600/523; 382/190; 715/767, 502
See application file for complete search history.

(56) References Cited

U.S. PATENT DOCUMENTS

| 3,710,095 | A |   | 1/1973 | Donohue et al. |
|---|---|---|---|---|
| 4,495,552 | A | * | 1/1985 | Graff ........................... 362/297 |
| 4,864,520 | A | * | 9/1989 | Setoguchi et al. ........... 345/420 |
| 5,034,867 | A |   | 7/1991 | Mayer |
| 5,056,045 | A | * | 10/1991 | Ohsawa ....................... 345/441 |
| 5,096,281 | A | * | 3/1992 | Windebank et al. ........ 359/868 |
| 5,255,352 | A | * | 10/1993 | Falk ............................. 345/582 |
| 5,390,097 | A | * | 2/1995 | Nino ........................... 362/346 |
| 5,483,430 | A |   | 1/1996 | Stapel et al. |
| 5,539,629 | A |   | 7/1996 | Chinniah et al. |
| 5,687,737 | A | * | 11/1997 | Branham et al. ............ 600/523 |
| 5,864,342 | A | * | 1/1999 | Kajiya et al. ................ 345/418 |
| 5,876,114 | A | * | 3/1999 | Nino ............................ 362/518 |

(Continued)

FOREIGN PATENT DOCUMENTS

JP 2001-101912 A 4/2001

(Continued)

*Primary Examiner*—Thai Phan
*Assistant Examiner*—Cuong Van Luu
(74) *Attorney, Agent, or Firm*—Sughrue Mion, PLLC

(57) ABSTRACT

A reflecting surface design system (50) has (1) first rendering means (54) for displaying a free-form surface (20) on which a plurality of segments (24), each of which is defined by a plurality of vertices ($25_1$ to $25_4$), are formed, (2) reflection information specifying means (56) for specifying the vertex position and light reflecting direction for each of the plurality of vertices ($25_1$ to $25_4$) that define one of the plurality of segments (24), and (3) surface calculation means (58) for calculating a surface (S) to be assigned to the one segment (24) on the basis of the vertex positions and light reflecting directions specified for the plurality of vertices ($25_1$ to $25_4$) that define one segment (24), and the light source position, which is specified in advance.

18 Claims, 23 Drawing Sheets

U.S. PATENT DOCUMENTS

| | | | |
|---|---|---|---|
| 5,954,427 A * | 9/1999 | Campos et al. | 362/517 |
| 6,128,631 A * | 10/2000 | Wallace et al. | 715/502 |
| 6,200,006 B1 * | 3/2001 | Natsume et al. | 362/297 |
| 6,361,195 B1 * | 3/2002 | Natsume | 362/518 |
| 6,473,238 B1 * | 10/2002 | Daniell | 359/622 |
| 6,493,096 B1 * | 12/2002 | Maeda et al. | 356/612 |
| 2001/0009354 A1 * | 7/2001 | Natsume | 315/77 |
| 2002/0003707 A1 * | 1/2002 | Woodward | 362/518 |
| 2002/0172039 A1 * | 11/2002 | Inditsky | 362/231 |
| 2003/0053230 A1 * | 3/2003 | Natsume | 359/869 |
| 2003/0112523 A1 * | 6/2003 | Daniell | 359/626 |
| 2003/0202349 A1 * | 10/2003 | Suehiro et al. | 362/245 |
| 2003/0214734 A1 * | 11/2003 | Nishioka et al. | 359/846 |
| 2003/0214736 A1 * | 11/2003 | Yoshikawa et al. | 359/858 |
| 2004/0160657 A1 * | 8/2004 | Tonar et al. | 359/265 |
| 2004/0189944 A1 * | 9/2004 | Kaufman et al. | 352/10 |
| 2005/0034080 A1 * | 2/2005 | Jaeger | 715/767 |
| 2005/0213820 A1 * | 9/2005 | Liu et al. | 382/190 |
| 2006/0077690 A1 * | 4/2006 | Inditsky | 362/615 |

FOREIGN PATENT DOCUMENTS

| | | |
|---|---|---|
| JP | 2001101912 A * | 4/2001 |

\* cited by examiner

Fig.4
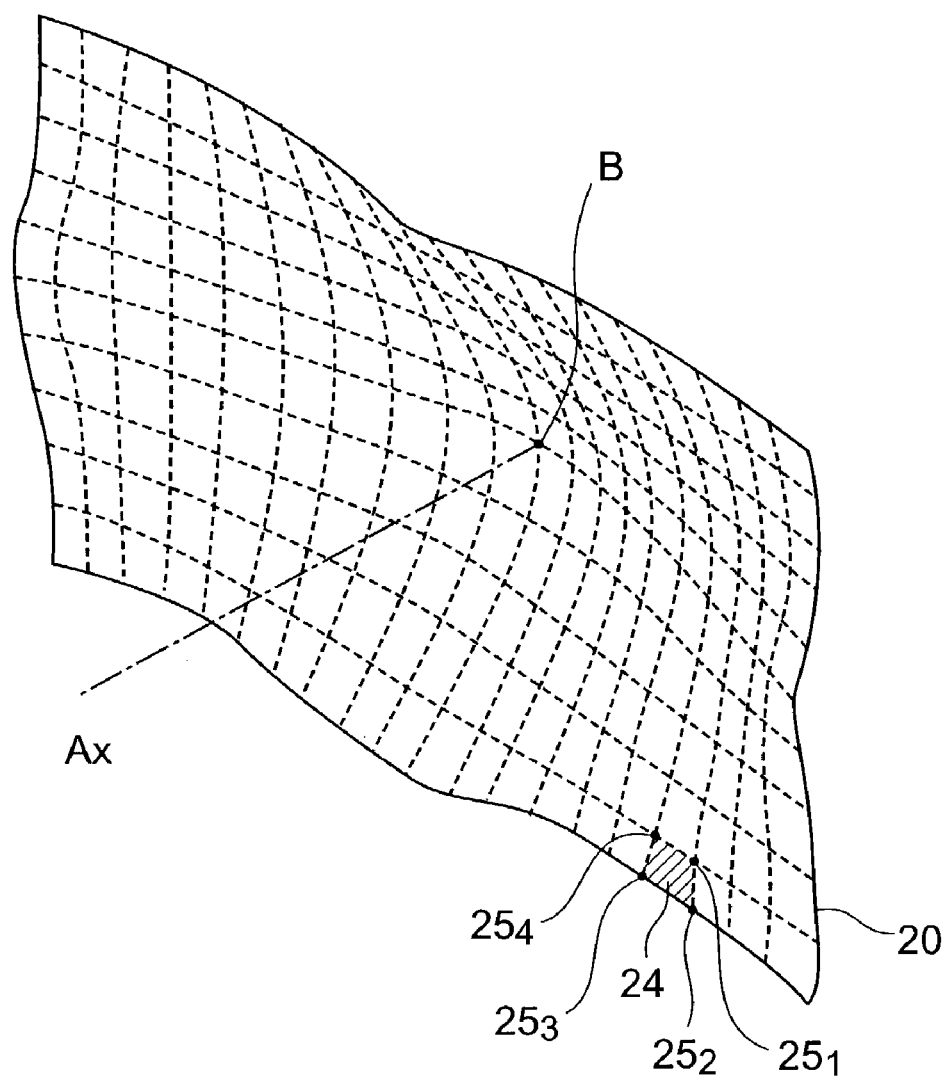
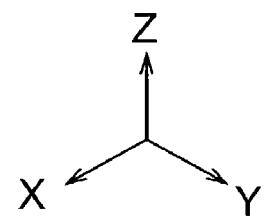

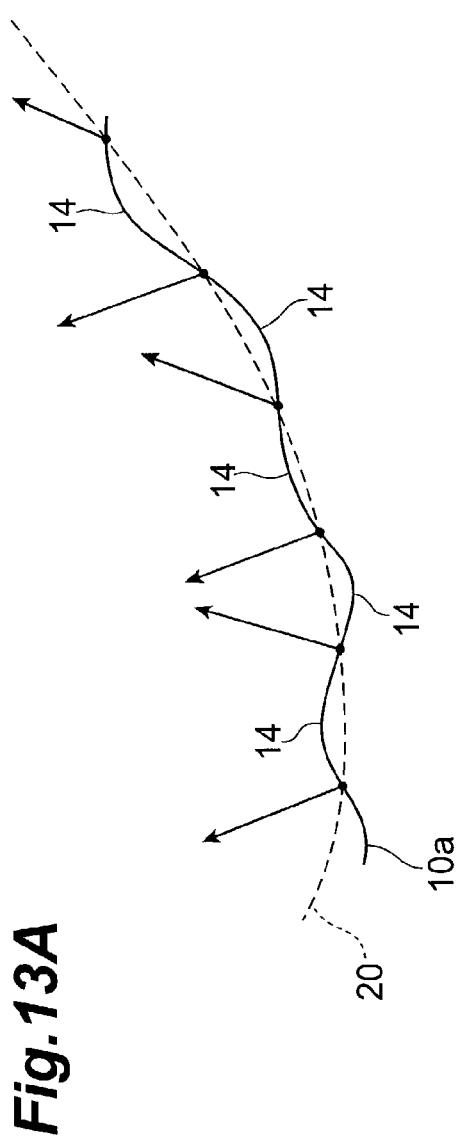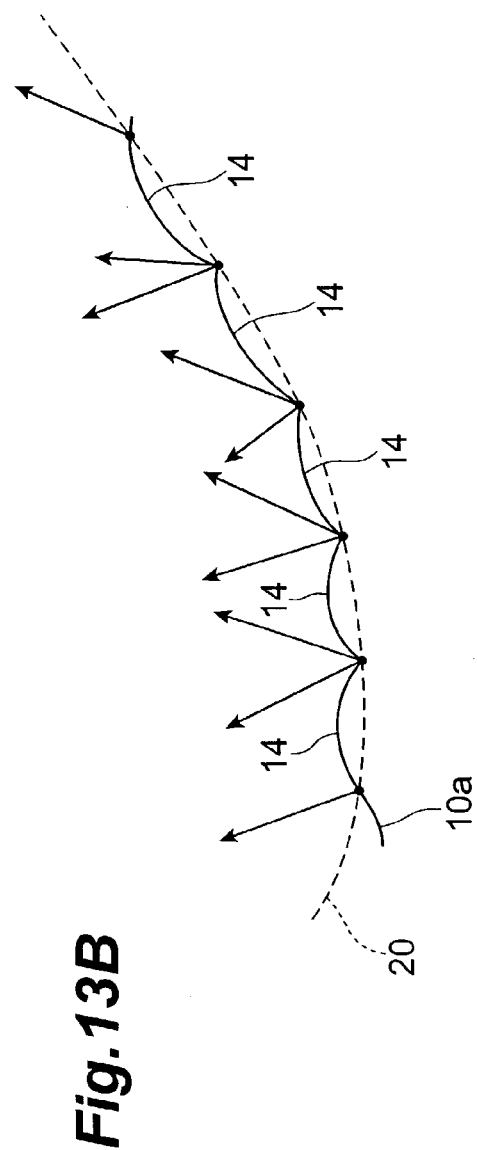

- TYPE → 1  75
  | 0:RECTANGLE | 1:REVOLUTION |

- POINT1 ANGLE → 20.0, -10.0  71
- POINT2 ANGLE → -20.0, -10.0  72
- POINT3 ANGLE → 20.0, 10.0  73
- POINT4 ANGLE → -20.0, 10.0  74

REFLECTING SURFACE DESIGN SYSTEM, REFLECTING SURFACE DESIGN METHOD, RECORDING MEDIUM, AND COMPUTER PROGRAM

BACKGROUND OF THE INVENTION

1. Field of the Invention

The present invention relates to a reflecting surface design system and method for designing a reflecting surface of a reflecting mirror of a lamp member used in a vehicle or the like such as an automobile or the like, a computer program for making a computer design a reflecting surface of a reflecting mirror of a lamp member, and a computer readable recording medium that records the computer program.

2. Related Background Art

A lamp member for a vehicle is formed by a light source, reflecting mirror, and lens. In such lamp member for a vehicle, light emitted by the light source becomes incident on the reflecting surface of the reflecting mirror. This incident light is reflected by respective segments of the reflecting surface in reflecting directions determined by their surface shapes, and leaves the lamp member via the lens.

Upon designing the lamp member for a vehicle, conditions in terms of a shape (shape constraint conditions) upon using the lamp member while being mounted on a vehicle such as an automobile or the like, and conditions in terms of an outer appearance (outer appearance constraint conditions) are imposed in addition conditions in terms of functions as a lamp (function constraint conditions). Therefore, it is demanded to design a lamp member that can optimize the conditions in terms of functions while satisfying the given shape and outer appearance constraint conditions.

The function constraint conditions include uniformity of light to be emitted by the entire lamp member, diffusion of light which is to be appropriately diffused and look bright when viewed from various directions, and the like, depending on the types of lamp members. The shape constraint conditions include a condition based on the volume and shape of a lamp member storage portion of a vehicle body, a condition based on the shape of a lamp member outer surface (lens outer surface) contiguous with other vehicle body portions, and the like. The outer appearance constraint condition include a condition based on matching with the outer appearance of other vehicle body portions, a condition based on requirements from design of the vehicle body, and the like.

SUMMARY OF THE INVENTION

In recent years, strict shape constraint conditions such as a further profile reduction of a lamp member and the like are required due to restrictions on a lamp member storage portion in the vehicle body configuration, higher requirements on design improvement of vehicles, and the like. To meet such requirements, a reflecting mirror whose reflecting surface has a basic shape defined by a free-form surface has been proposed. When the free-form surface is used, shape restriction conditions such as a profile reduction of a lamp member and the like can be relatively easily cleared due to its high degree of freedom in design.

However, when the basic shape of the reflecting surface is defined by a free-form surface, a conventional design system that assigns a geometric surface such as a paraboloid of revolution or the like to each segment of the free-form surface has a low degree of freedom in control of light reflecting directions, resulting in poor controllability of a light distribution pattern, and complicated design processes.

The present invention has been made to solve the aforementioned problems, and has as its object to provide a reflecting surface design system and method for designing a reflecting surface of a reflecting mirror of a lamp member while improving the controllability of a light distribution pattern and the efficiency of design processes, a computer program for making a computer design a reflecting surface of a reflecting mirror of a lamp member, and a computer readable recording medium that records the computer program.

A reflecting surface design system according to the present invention is a system for designing a reflecting surface of a reflecting mirror of a lamp member. This system comprises first rendering means, reflection information specifying means, and surface calculation means. The first rendering means displays a free-form surface formed by a plurality of segments each of which is defined by a plurality of vertices. The reflection information specifying means specifies a vertex position and light reflecting direction of each of a plurality of vertices which define one of the plurality of segments. The surface calculation means calculates a surface to be assigned to one segment on the basis of the vertex positions and light reflecting directions specified for the plurality of vertices which define that segment, and a light source position specified in advance.

A reflecting surface design method according to the present invention is a method of designing a reflecting surface of a reflecting mirror of a lamp member. This method comprises the first rendering step, the reflection information specifying step, and the surface calculation step. The first rendering step displays a free-form surface formed by a plurality of segments each of which is defined by a plurality of vertices. The reflection information specifying step specifies a vertex position and light reflecting direction of each of a plurality of vertices which define one of the plurality of segments. The surface calculation step calculates a surface to be assigned to one segment on the basis of the vertex positions and light reflecting directions specified for the plurality of vertices which define that segment, and a light source position specified in advance.

With the above reflecting surface design system and method, a free-form surface is displayed first. The vertex position and light reflecting direction of each of a plurality of vertices which define one segment of the free-form surface are specified. A surface to be assigned to one segment is generated on the basis of the vertex positions and light reflecting directions specified for the plurality of vertices which define that segment, and a light source position specified in advance.

In this way, a surface to be assigned to one segment is generated based on the vertex positions and light reflecting directions of that segment, and the light source position. That is, when the light reflecting directions at respective vertices of a given segment are set in a desired direction, a surface is generated to reflect light in that direction. Hence, the designer can control the directions of light reflected by the surface to be generated to fall within a desired range by controlling the light reflecting directions at respective vertices of a given segment in a desired direction, thus improving the controllability of a light distribution pattern. Since a surface to be assigned to a given segment can be generated by specifying only the vertex positions and light reflecting directions at respective vertices of that segment, the design process efficiency can be improved.

The reflecting surface design system according to the present invention preferably comprises second rendering means for displaying the surface calculated by the surface calculation means. The reflecting surface design method according to the present invention preferably comprises the second rendering step of displaying the surface calculated in the surface calculation step. In this manner, the generated surface can be confirmed.

Preferably, the reflecting surface design system according to the present invention comprises third rendering means for displaying straight lines respectively extending from a plurality of vertices that define one segment in a predetermined direction, and the reflection information specifying means specifies the start point position of one straight line selected from the plurality of straight lines as the vertex position of one vertex, and specifies the extending direction of one straight line as the light reflecting direction at one vertex.

Preferably, the reflecting surface design method according to the present invention comprises the third rendering step of displaying straight lines respectively extending from a plurality of vertices that define one segment in a predetermined direction, and the reflection information specifying step includes the step of specifying the start point position of one straight line selected from the plurality of straight lines as the vertex position of one vertex, and specifying the extending direction of one straight line as the light reflecting direction at one vertex.

In this manner, by selecting one of a plurality of straight lines, the vertex position and light reflecting direction at one vertex can be specified.

In the reflecting surface design system according to the present invention, the third rendering means preferably displays the already selected ones of the plurality of straight lines to be distinguished from straight lines which have not been selected yet. Also, in the reflecting surface design method according to the present invention, the third rendering step preferably includes the step of displaying the already selected ones of the plurality of straight lines to be distinguished from straight lines which have not been selected yet. In this way, the designer can easily recognize straight lines, which have not been selected yet, thus further improving the design process efficiency.

The reflecting surface design system according to the present invention may comprise fourth rendering means for displaying a plurality of straight lines which extend from a predetermined position in a space that contains a free-form surface in a predetermined direction, and the reflection information specifying means may specify the vertex position of one vertex selected from a plurality of vertices, and may specify the extending direction of one straight line selected from the plurality of straight lines as the light reflecting direction at one vertex.

The reflecting surface design method according to the present invention may comprise the fourth rendering step of displaying a plurality of straight lines which extend from a predetermined position in a space that contains a free-form surface in a predetermined direction, and the reflection information specifying step may include the step of specifying the vertex position of one vertex selected from a plurality of vertices, and specifying the extending direction of one straight line selected from the plurality of straight lines as the light reflecting direction at one vertex.

In this way, by selecting one of a plurality of vertices, the vertex position of the selected vertex can be specified. Also, by selecting one of a plurality of straight lines, the light reflecting direction at that vertex can be specified.

In the reflecting surface design system according to the present invention, the fourth rendering means may display the already selected ones of the plurality of straight lines to be distinguished from straight lines which have not been selected yet. Also, in the reflecting surface design method according to the present invention, the fourth rendering step may include the step of displaying the already selected ones of the plurality of straight lines to be distinguished from straight lines which have not been selected yet. In this way, the designer can easily recognize straight lines, which have not been selected yet, thus further improving the design process efficiency.

The reflecting surface design system according to the present invention may comprise fifth rendering means for displaying an angle input window that makes a user input angle information used to specify the light reflecting direction at each of a plurality of vertices, and the reflection information specifying means may specify the vertex position of one vertex selected from a plurality of vertices, and may specify the light reflecting direction at one vertex on the basis of the angle information input for that vertex.

The reflecting surface design method according to the present invention may comprise the fifth rendering step of displaying an angle input window that makes a user input angle information used to specify the light reflecting direction at each of a plurality of vertices, and the reflection information specifying step may include the step of specifying the vertex position of one vertex selected from a plurality of vertices, and specifying the light reflecting direction at one vertex on the basis of the angle information input for that vertex.

In this manner, by selecting one of a plurality of vertices, the vertex position of the selected vertex can be specified. Also, the light reflecting direction at that vertex can be specified on the basis of the angle information input via the angle input window.

A recording medium according to the present invention records a program for making a computer implement a method of the present invention. A computer program according to the present invention makes a computer implement a method of the present invention. A computer data signal embodied in a carrier wave according to the present invention makes a computer implement a method of the present invention.

The present invention will be understood more sufficiently by way of the following detailed description and the accompanying drawings. However, these are presented merely for an exemplification purpose, and do not limit the present invention.

BRIEF DESCRIPTION OF THE DRAWINGS

FIG. 4 shows a free-form surface used upon designing a reflecting surface in the first embodiment;

FIGS. 13A and 13B are views showing sections of the designed reflecting surface;

FIG. 21 shows an example of an angle input window used upon designing a reflecting surface in the third embodiment;

DETAILED DESCRIPTION OF THE PREFERRED EMBODIMENTS

Figure 1:
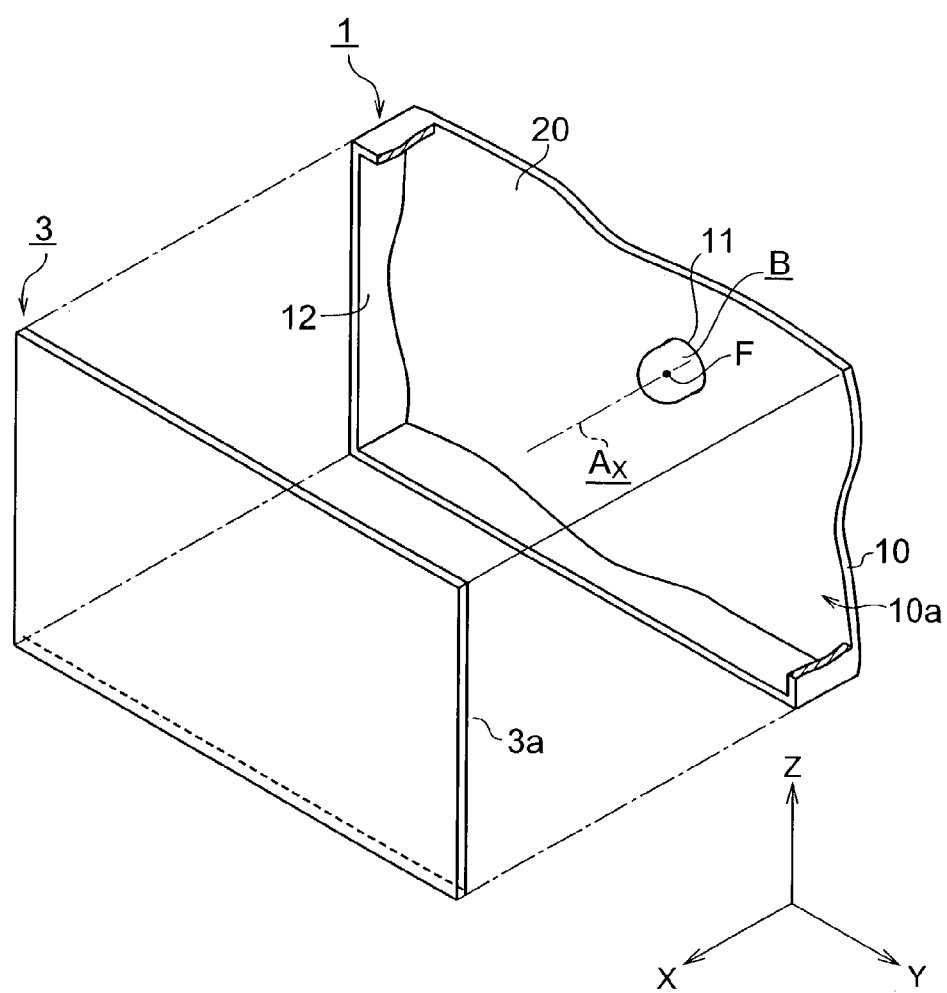
FIG. 1 is a partially cutaway, exploded perspective view showing the arrangement of a lamp member for a vehicle.

Preferred embodiments of the present invention will be described in detail hereinafter with reference to the accompanying drawings. Note that the same reference numerals denote the same elements throughout the description of the drawings, and a repetitive description thereof will be omitted. Also, the dimensional ratio of the drawings does not always match that in the description.

Prior to a description of the preferred embodiments of the present invention, a lamp member for a vehicle will be explained.

Figure 2:
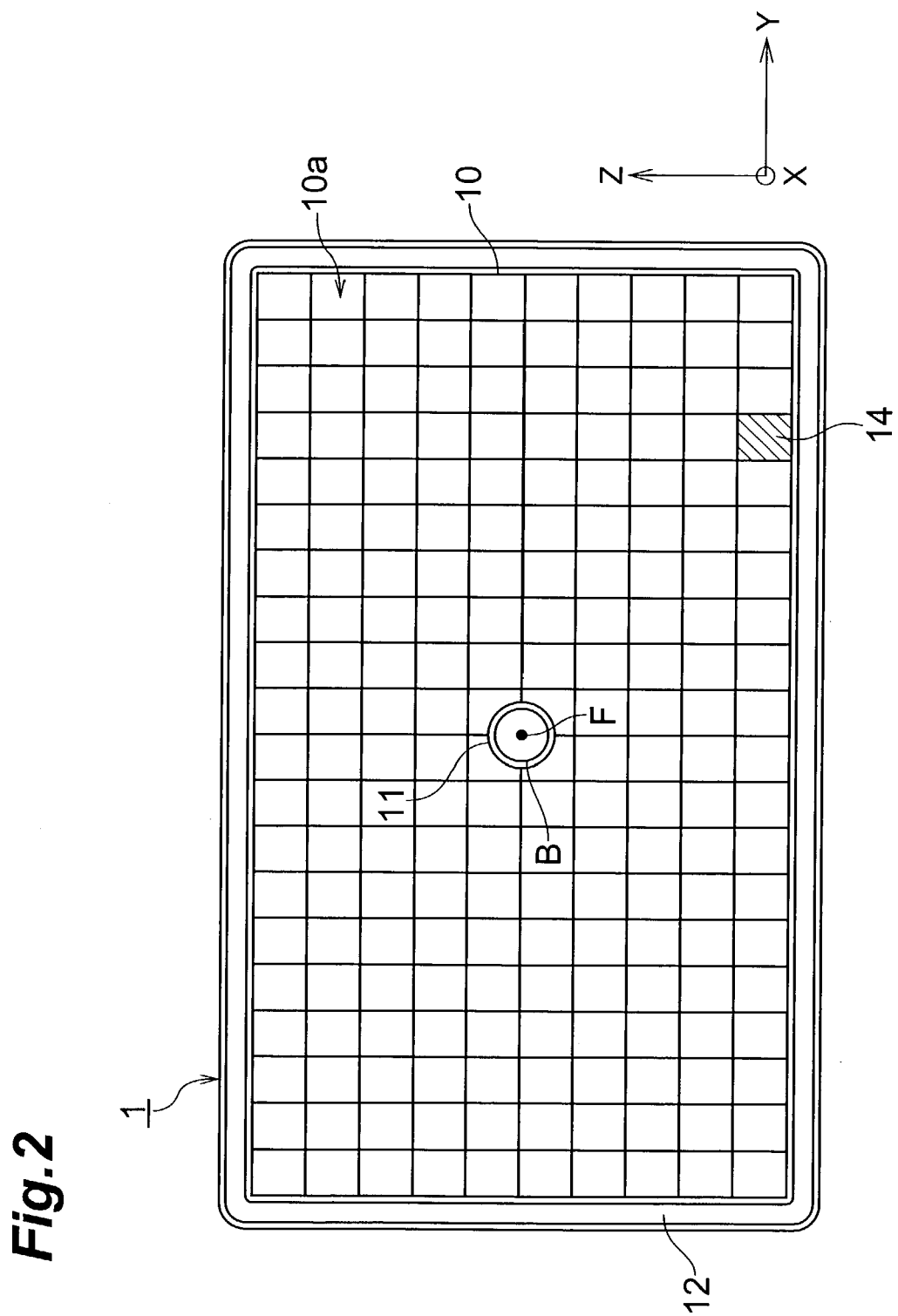
FIG. 2 is a plan view showing the arrangement of a reflecting mirror of the lamp member for a vehicle shown in FIG. 1.

FIG. 1 is a partially cutaway, exploded perspective view showing an example of the arrangement of a lamp member for a vehicle. FIG. 2 is a plan view showing the arrangement of a reflecting mirror of the lamp member for a vehicle shown in FIG. 1. In the following description, the coordinate axes of an XYZ system are defined so that the X-axis agrees with the back-and-forth direction as a direction of an optical axis Ax of the lamp member, the Y-axis agrees with the right-and-left direction of the lamp member, and the Z-axis agrees with the up-and-down direction, as shown in FIGS. 1 and 2.

This lamp member for a vehicle is applied to, e.g., a marker lamp such as a tail lamp of an automobile, and comprises a reflecting mirror 1, lens 3, and light source bulb B, as shown in FIG. 1.

The reflecting mirror 1 is formed into a substantially rectangular shape when viewed from the X-axis direction to have, as the center, the optical axis AX which is set based on the back-and-forth direction of a vehicle to which the lamp member is attached, the light projection direction of the lamp member, and the like. This reflecting mirror 1 has a reflecting mirror portion 10, whose surface opposing the lens 3 serves as a reflecting surface 10a and reflects light, and an outer frame portion 12 which is arranged to surround the reflecting surface 10a, and aligns and fixes the reflecting surface 10a with respect to the lens 3.

The lens 3 is set to be nearly perpendicular to the optical axis Ax. This lens is a no-step through lens, since the reflecting surface 10a of the reflecting mirror 1 has a diffusion function in two directions.

The light source bulb B is inserted from a light source insertion hole 11 formed at nearly the center of the reflecting mirror portion 10, and is set with respect to the reflecting mirror 1, so as to locate its light source point F at a predetermined position on the optical axis Ax.

Note that various conditions such as substantially the rectangular outer shape of the reflecting mirror 1 (the outer shape of the outer frame portion 12 or the like), the setting angle of the lens 3 with respect to the optical axis AX, the setting position of the light source bulb B, and the like are examples, and are appropriately set in general in consideration of the shape constraint conditions given from the vehicle body side such as the volume and shape of a lamp member storage portion of the vehicle body, the shape of a lamp member outer surface (lens outer surface) contiguous with other vehicle body portions, and the like.

FIG. 1 shows the reflecting surface 1 and lens 3 which form the lamp member for a vehicle in an exploded state, and shows the shape of the reflecting surface 10a by partially cutting away the outer frame portion 12 of the reflecting mirror 1. However, FIG. 1 does not illustrate a plurality of reflecting surface elements 14 (see FIG. 2) which are arranged in arrays, and form the reflecting surface 10a, and shows the surface shape of the reflecting surface 10a by a free-form surface 20 as a basic shape of the reflecting surface 10a.

The free-form surface 20 defines the basic shape of the reflecting surface 10a, and an actual surface shape of the reflecting surface is determined on the basis of this free-form surface. This free-from surface is selected as a free surface, which satisfies given conditions such as the shape constraint conditions or the like without using a single paraboloid of revolution or the like as the basic shape.

The reflecting surface 10a is formed by assigning a plurality of reflecting surface elements 14 (individual rectangular sections shown in FIG. 2) to segments obtained by dividing the free-form surface 20 as its basic shape into arrays, as shown in FIG. 2. In FIG. 2, one reflecting surface element 14 is hatched to clarify its range. The reflecting surface 10a has a structure obtained by dividing it into segments at given pitches in the orthogonal Y- and Z-axis directions, so that the shapes of respective segments corresponding to individual reflecting surface elements 14 have identical rectangular shapes when viewed from the X-axis direction.

A reflecting surface design system and method, recording medium, and computer program according to the present invention are used to design the reflecting surface of the reflecting mirror of the lamp member for a vehicle with the above arrangement. Note that design of the reflecting surface indicates that of reflecting surface data on the computer screen. Preferred embodiments of the present invention will be described below.

(First Embodiment)

Figure 3:
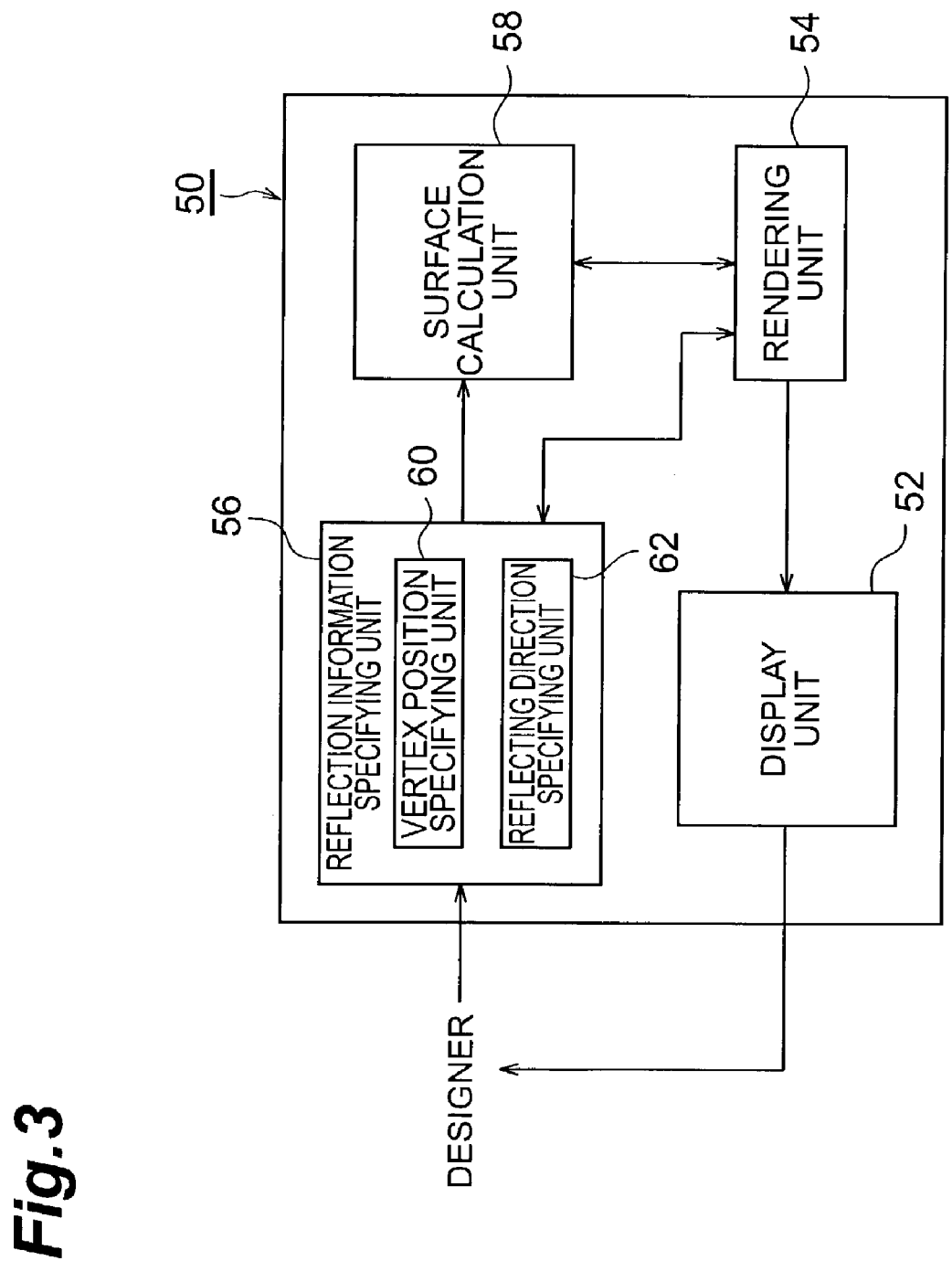
FIG. 3 is a block diagram showing the arrangement of a reflecting surface design system.

FIG. 3 is a block diagram showing the arrangement of a reflecting surface design system 50 according to the first embodiment. As shown in FIG. 3, the reflecting surface design system 50 comprises a display unit 52, rendering unit 54, reflection information specifying unit 56, and surface calculation unit 58.

The display unit 52 displays various windows used to design the reflecting surface 10a to the designer.

The rendering unit 54 instructs the display unit 52 to display various windows used to design the reflecting surface 10a. This rendering unit 54 includes an image data generator for generating image data, a storage unit for saving image data, and the like (neither are shown).

More specifically, the rendering unit 54 instructs the display unit 52 to display the free-form surface 20 (first rendering means). The display unit 52 displays the free-form surface 20, as shown in FIG. 4, in accordance with the instruction from the rendering unit 54. This free-form surface 20 defines the basic shape of the reflecting surface 10a, as described above, and an actual surface shape of the reflecting surface 10a is determined based on this surface.

As shown in FIG. 4, this free-form surface 20 is divided into a plurality of segments 24 by a plurality of boundary lines. Hence, each segment 24 is defined by a plurality of vertices $25_1$ to $25_4$ (four vertices in FIG. 4) as intersections of the boundary lines. This free-form surface 20 is generated in the XYZ space, has the light source point F (light source position) of the light source bulb B as an origin, and has the direction of the optical axis Ax agreeing with the X-axis direction. The respective segments 24 have identical rectangular shapes when viewed from the X-axis direction, and orthogonal boundary lines respectively agree with the Y- and Z-axis directions.

Figure 5:
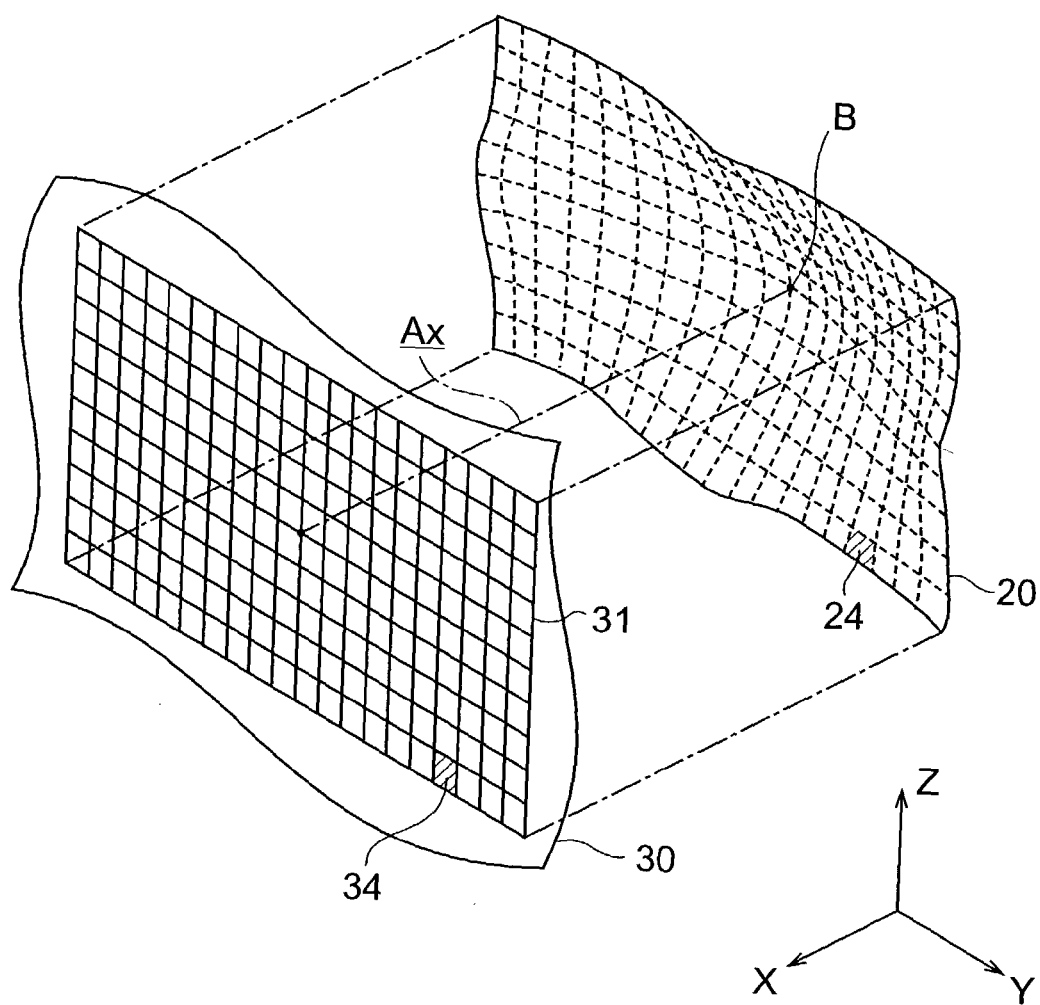
FIG. 5 is a view for explaining a process for dividing the free-form surface into segments.

This free-form surface 20 is generated in advance by the designer as follows. That is, as shown in FIG. 5, a reference plane 30 perpendicular to the optical axis Ax is defined to face a free-form surface before being divided into segments. A predetermined region 31 within this reference plate 30 is divided at given pitches in the orthogonal Y- and Z-axis directions, which are perpendicular to the optical axis Ax, thus generating rectangular reference segments 34 which are divided into arrays. The reference segments 34 are projected onto the free-form surface before being divided into segments. Note that this free-form surface 20 may be generated by the rendering unit 54.

Figure 6:
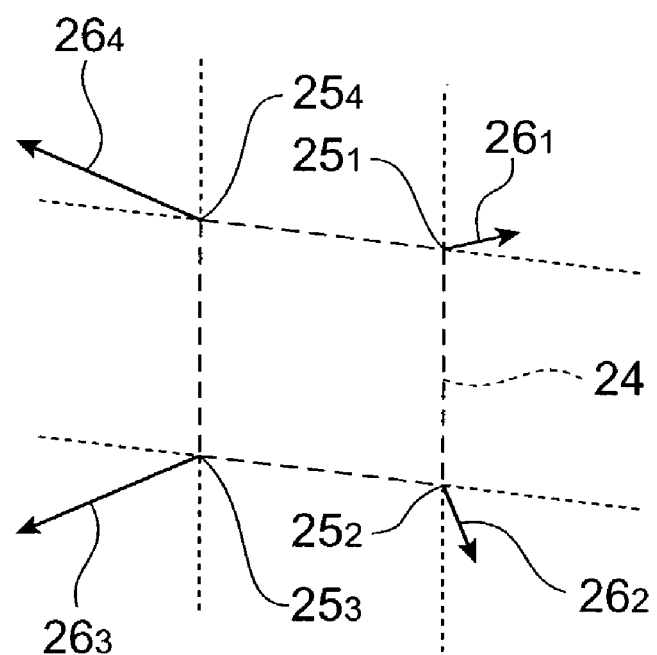
FIG. 6 is a view showing light reflecting directions at respective vertices which define one segment.

The rendering unit 54 instructs the display unit 52 to display straight lines $26_1$ to $26_4$, which extend in predetermined directions from a plurality of vertices $25_1$ to $25_4$ that define one segment 24 (third rendering means). The display unit 52 displays these straight lines $26_1$ to $26_4$, as shown in FIG. 6, in accordance with the instruction from the rendering unit 54. These straight lines $26_1$ to $26_4$ are generated by the designer in correspondence with the vertices $25_1$ to $25_4$ of one segment 24 for which a reflecting surface element 14 is to be formed. The extending directions of these straight lines $26_1$ to $26_4$ indicate the reflecting directions of light, which comes from the light source bulb B and is reflected at the vertices $25_1$ to $25_4$ of that segment 24. Note that the rendering unit 54 may change the colors of these straight lines $26_1$ to $26_4$ upon display.

The reflection information specifying unit 56 has a vertex position specifying unit 60 and reflecting direction specifying unit 62, as shown in FIG. 3. The reflection information specifying unit 56 accepts one straight line selected by the designer from the plurality of straight lines $26_1$ to $26_4$ displayed on the display unit 52. The vertex position specifying unit 60 specifies, as a coordinate position, the start point position of this straight line on the basis of data saved in the rendering unit 54, and specifies this position as the vertex position of one vertex. The reflecting direction specifying unit 62 specifies, as a vector, the extending direction of this straight line on the basis of data saved in the rendering unit 54, and specifies this direction as the light reflecting direction at one vertex.

The surface calculation unit 58 receives the vertex positions and light reflecting directions specified for the plurality of vertices $25_1$ to $25_4$ that define one segment 24 from the reflection information specifying unit 56. Also, the unit 58 specifies, as a coordinate position, the light source position of the light source bulb B on the basis of data saved in the rendering unit 54. The unit 58 then calculates a surface to be assigned to a given segment 24 on the basis of the vertex positions and light reflecting directions specified for the plurality of vertices $25_1$ to $25_4$ that define that segment 24, and the light source position. The calculated surface becomes the surface shape of the reflecting surface element 14. Note that a practical method of calculating the surface will be described later.

Figure 7:
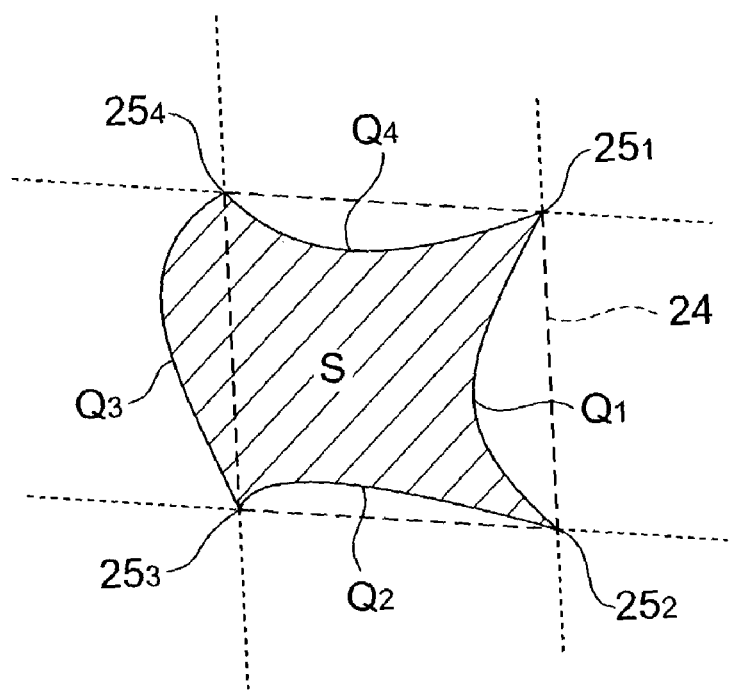
FIG. 7 is a view showing a process for generating a surface as a reflecting surface element on one segment.

The rendering unit 54 instructs the display unit 52 to display the surface calculated by the surface calculation unit 58 (second rendering means). The display unit 52 displays this surface S, as shown in FIG. 7, in accordance with the instruction from the rendering unit 54.

Figure 8:
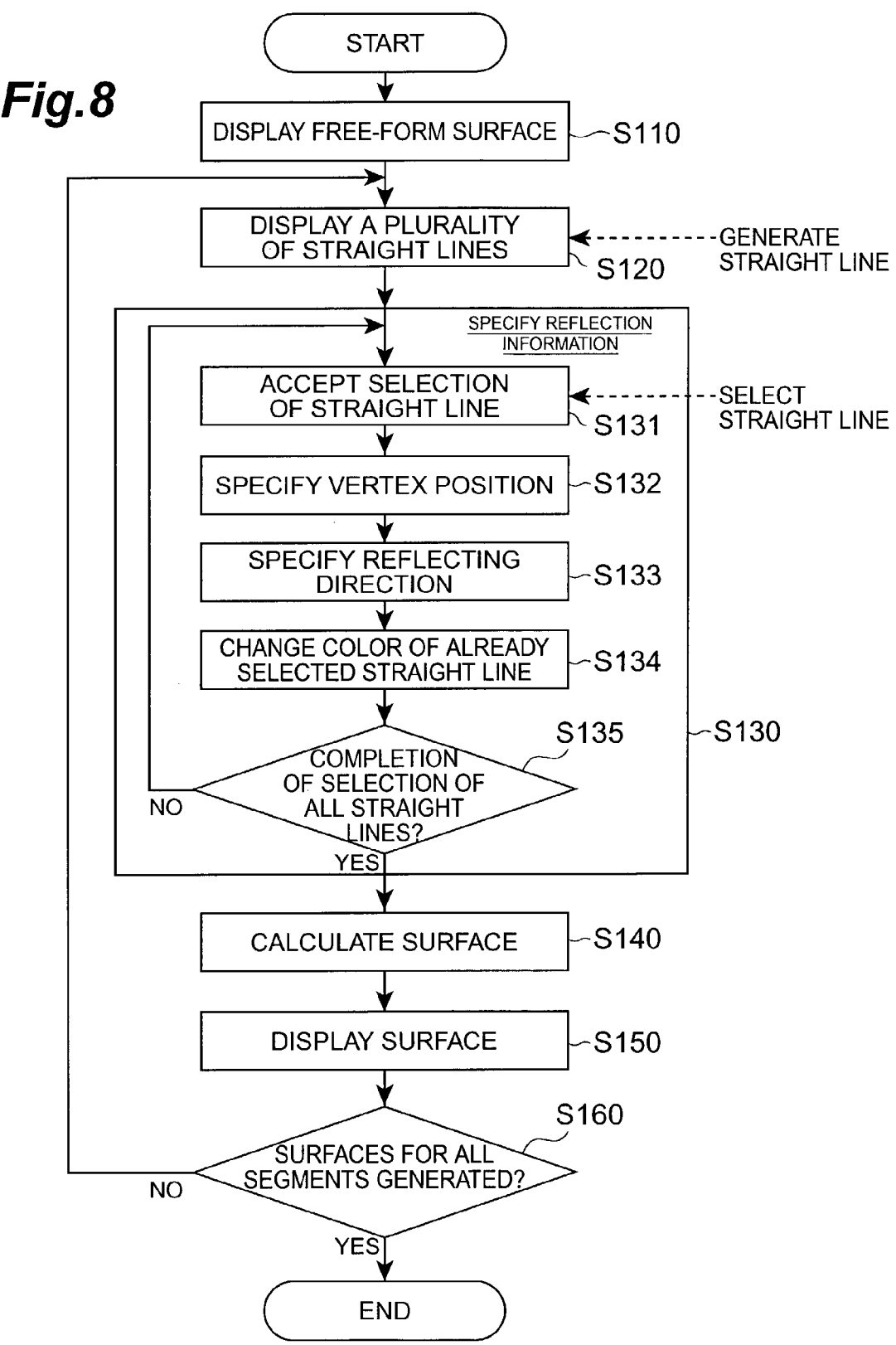
FIG. 8 is a flow chart for explaining a reflecting surface design method according to the first embodiment.

The reflecting surface design method according to this embodiment using the reflecting surface design system 50 with the above arrangement will be described below with reference to the flow chart shown in FIG. 8. Note that the flow chart in FIG. 8 shows the flow of processes in the reflecting surface design system 50, and designer's actions are indicated by the broken arrows on the right side of the flow.

The rendering unit 54 instructs the display unit 52 to display the free-form surface 20. The display unit 52 displays the free-form surface 20, as shown in FIG. 4, in accordance with the instruction from the rendering unit 54 (first rendering step: step S110). The designer determines one segment 24 used to form a reflecting surface element 14, from a plurality of segments of the free-form surface 20 displayed on the display unit 52. Then, the designer generates straight lines $26_1$ to $26_4$, which extend in predetermined directions from a plurality of vertices $25_1$ to $25_4$ that define the segment 24. These straight lines $26_1$ to $26_4$ indicate the reflecting directions of light, which comes from the light source bulb B and is reflected at respective vertices $25_1$ to $25_4$. The rendering unit 54 instructs the display unit 52 to display these straight lines $26_1$ to $26_4$ generated by the designer. The display unit 52 displays these straight lines $26_1$ to $26_4$, as shown in FIG. 6, in accordance with the instruction from the rendering unit 54 (third rendering step: step S120).

The designer selects one straight line $26_1$ by clicking it from the plurality of straight lines $26_1$ to $26_4$ displayed on the display unit 52. In response to this selection, the reflection information specifying unit 56 accepts the straight line $26_1$ selected by the designer (step S131). The vertex position specifying unit 60 specifies, as a coordinate position, the start point position of this straight line $26_1$ on the basis of data saved in the rendering unit 54, and specifies this position as the vertex position of one vertex $25_1$ (step S132). The reflecting direction specifying unit 62 specifies, as a vector, the extending direction of this straight line $26_1$ on the basis of data saved in the rendering unit 54, and specifies this direction as the light reflecting direction at one vertex $25_1$ (step S133).

The rendering unit 54 instructs the display unit 52 to change the color of the selected straight line $26_1$ and to display it to be distinguished from straight lines $26_2$ to $26_4$, which have not been selected yet (step S134). Note that the method of distinguishing the already selected straight line from non-selected straight lines is not limited to the method of changing the color. For example, the already selected straight line may be displayed to be bolder than non-selected straight lines or may be displayed as the broken line or arrow. The reflection information specifying unit 56 checks if selection of all the plurality of straight lines $26_1$ to $26_4$ is complete (step S135). If selection of all the plurality of straight lines $26_1$ to $26_4$ is not complete yet, the flow returns to step S131 to accept selection of the remaining straight lines $26_2$ to $26_4$, and to specify the vertex positions and light reflecting directions of the remaining vertices $25_2$ to $25_4$. Upon completion of selection of all the plurality of straight lines $26_1$ to $26_4$, the flow advances to step S140.

In this manner, the designer repetitively selects one of the plurality of straight lines $26_1$ to $26_4$ displayed on the display unit 52. In response to the selection, the reflection information specifying unit 56 specifies the vertex positions and light reflecting directions of all the plurality of vertices $25_1$ to $25_4$ that define the segment 24 (reflection information specifying step: step S130).

The surface calculation unit 58 receives the vertex positions and light reflecting directions of the plurality of vertices $25_1$ to $25_4$ that define one segment 24 from the reflection information specifying unit 56. Also, the unit 58 specifies, as a coordinate position, the light source position of the light source bulb B on the basis of data saved in the rendering unit 54. The unit 58 then calculates a surface to be assigned to that segment 24 on the basis of the vertex positions and light reflecting directions of the plurality of vertices $25_1$ to $25_4$ that define the segment 24 and the light source position (surface calculation step: step S140). The surface calculated in this manner is used as the surface shape of the reflecting surface element 14 to be assigned to that segment 24.

The method of generating a surface in the surface calculation unit 58 will be described in detail below.

Figure 9:
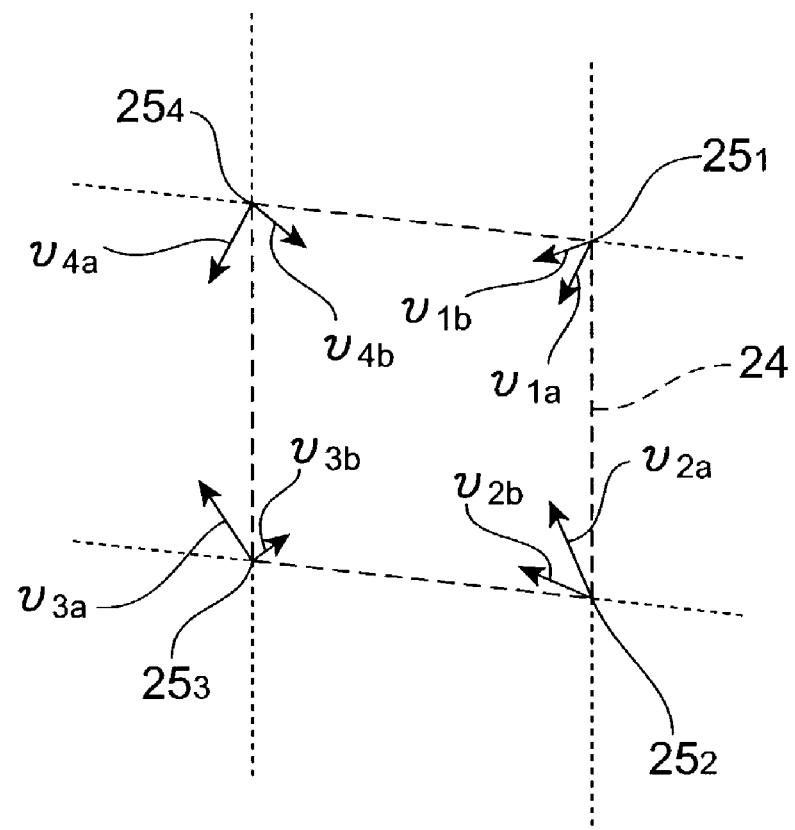
FIG. 9 is a view showing two independent surface generation directions at respective vertices which define one segment.

On the basis of the light reflecting directions at the vertices $25_1$ to $25_4$ of the segment 24 specified in the reflection information specifying step, two each independent surface generation directions $v_{1a}$ to $v_{4a}$ and $v_{1b}$ to $v_{4b}$ at the vertices $25_1$ to $25_4$, which are used to generate a surface to be assigned to that segment 24, are specified, as shown in FIG. 9. These surface generation directions are uniquely determined if the light reflecting directions at the vertices $25_1$ to $25_4$ are specified. The surface generation directions are specified as follows.

Figure 10:
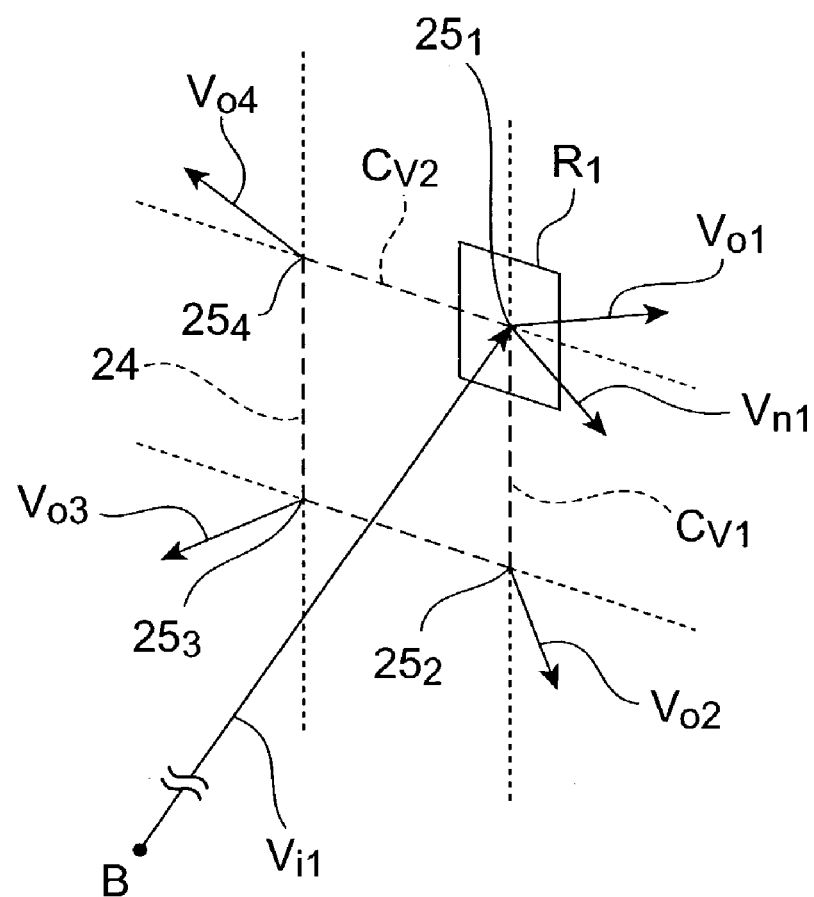
FIG. 10 is a view for explaining a method of determining surface generation directions at respective vertices which define one segment.

As shown in FIG. 10, a normal vector $v_{n1}$ to a reflecting plane $R_1$ that reflects light from the light source bulb B in the reflecting direction at the vertex $25_1$ is calculated. This normal vector $v_{n1}$ can be calculated by:

$$v_{n1}=(v_{o1}-v_{i1})/2 \quad (1)$$

where $v_{i1}$ is a unit vector indicating the direction of light coming from the light source bulb B, and $v_{o1}$ is a unit vector indicating the reflecting direction of light at the vertex $25_1$.

Subsequently, a vector $v_{1a}$, which is perpendicular to the normal vector $v_{n1}$ and also to the Y-axis, is calculated. This vector $v_{1a}$ can be calculated by:

$$v_{1a}=v_{n1} \times v_y \quad (2)$$

where $v_y$ is a normal vector to a plane, which includes a boundary line Cv1 of the segment 24, and is perpendicular to the Y-axis. Note that "x" represents the outer product of vectors. The same applies to the following description.

Furthermore, a vector $v_{1b}$, which is perpendicular to the normal vector $v_{n1}$ and also to the Z-axis, is calculated. This vector $v_{1b}$ can be calculated by:

$$v_{1b}=v_{n1} \times v_z \quad (3)$$

where $v_z$ is a normal vector to a plane, which includes a boundary line Cv2 of the segment 24, and is perpendicular to the Z-axis.

The directions of the vectors $v_{1a}$ and $v_{1b}$ calculated in this way are specified as the surface generation directions at the vertex $25_1$, which are used to generate a surface to be assigned to the segment 24. The same processes are repeated for other vertices $25_2$ to $25_4$. In this manner, the surface generation directions $v_{1a}$ to $v_{4a}$ and $v_{1b}$ to $v_{4b}$ at all the vertices $25_1$ to $25_4$ are determined.

Then, the surface shape of a surface to be assigned to that segment 24 is determined on the basis of the surface generation directions specified for the vertices $25_1$ to $25_4$ of the segment 24, and the vertex positions of the vertices $25_1$ to $25_4$.

Figure 11:
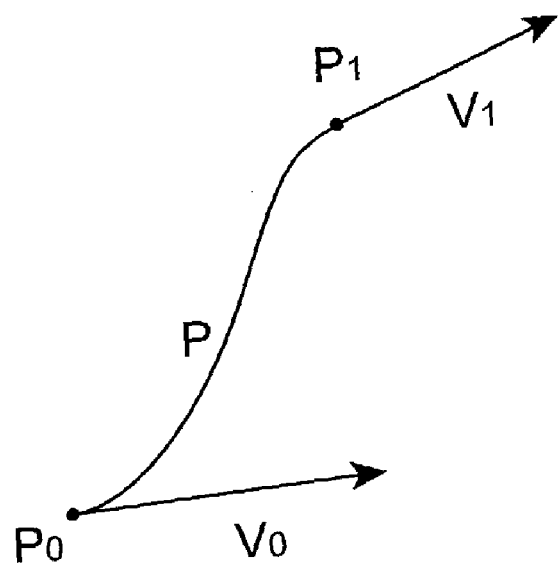
FIG. 11 is a view for explaining an Hermite curve.

If the surface generation directions and vertex positions at the vertices $25_1$ to $25_4$ of the segment 24 have been determined, peripheral curves $Q_1$ to $Q_4$ that connect the vertices $25_1$ to $25_4$ can be generated using, e.g., tangential spline curves or cubic Hermite curves. Of these curves, an Hermite curve is defined to complement a pair of vertices of a segment and derived functions there if they are given. Normally, the Hermite curve is a polynomial curve defined in a parameter domain [0, 1]. As shown in FIG. 11, a cubic Hermite curve is defined by end points $p_0$ and $p_1$, and tangent vectors $v_0$ and $v_1$ to them. The Hermite curve is given by:

$$P(t)=p_0 H_0^3(t)+v_0 H_1^3(t)+v_1 H_2^3(t)+p_1 H_3^3(t) \quad (4)$$

where $H_i^3(t)$ is a polynomial called a cubic Hermitian function. Based on conditions at the two end points $p_0$ and $p_1$ (t=0, 1), respective Hermitian functions are given by:

$$H_0^3(t)=(2t+1)(1-t)^2 \quad (5a)$$

$$H_1^3(t)=t(1-t)^2 \quad (5b)$$

$$H_2^3(t)=t^2(1-t) \quad (5c)$$

$$H_3^3(t)=t^2(3-2t) \quad (5d)$$

Note that the surface generation directions at the respective vertices $25_1$ to $25_4$ of the segment 24 correspond to the directions of the tangent vectors $v_0$ and $v_1$. Hence, as shown in, e.g., FIG. 9, the peripheral curve $Q_1$ that connects the vertices $25_1$ and $25_2$ can be determined using the cubic Hermitian function on the basis of the surface generation directions $v_{1a}$ and $v_{2a}$ at the vertices $25_1$ and $25_2$.

In this manner, the peripheral curves $Q_1$ to $Q_4$ of the surface to be assigned to the segment 24 are determined, as shown in FIG. 7. A surface S is generated based on the four peripheral curves $Q_1$ to $Q_4$, and is determined as the surface shape of the surface to be assigned to that segment 24.

Note that the surface shape of the surface to be assigned to the segment 24 can be determined more easily using a Coons bi-cubic surface that expands the Hermite curve to a surface.

Figure 12:
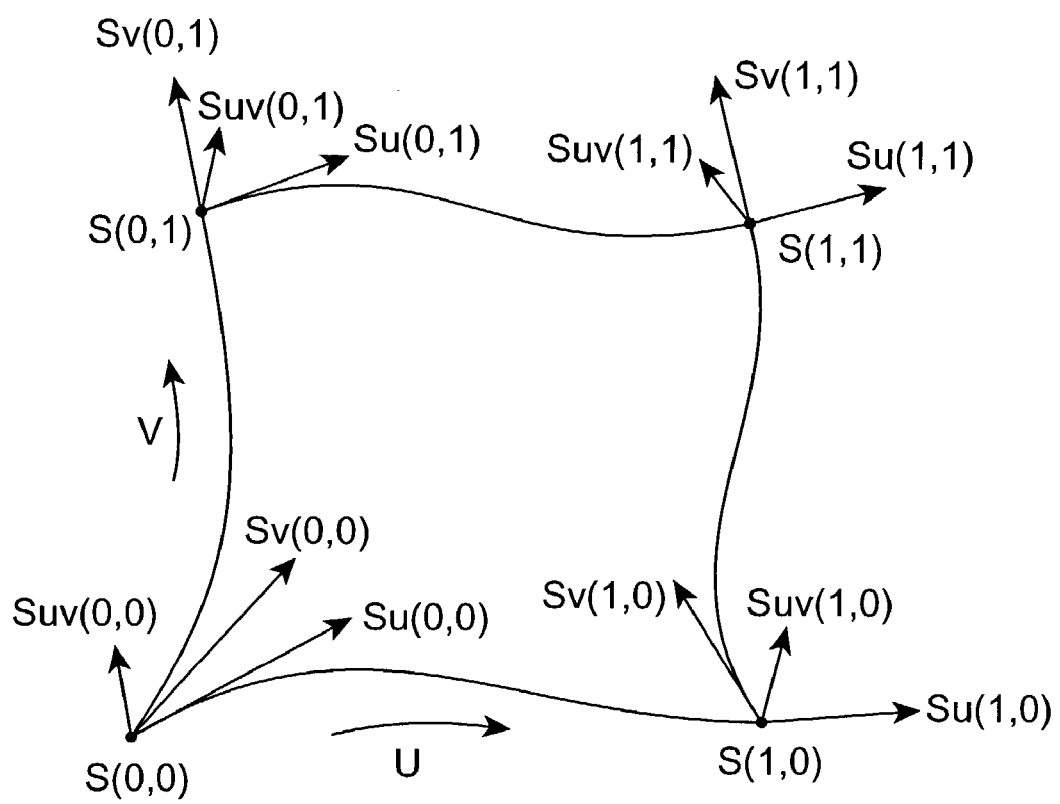
FIG. 12 is a view for explaining a bi-cubic surface.

A bi-cubic surface is a cubic polynomial surface defined by the vertices of a segment, and tangent and twist vectors there, as shown in FIG. 12. A parameter domain in which the bi-cubic surface is defined is [0, 1] for u, and [0, 1] for v. The bi-cubic surface is expressed using the cubic Hermitian function by:

$$S(u, v) = [H_0^3(u) \ H_1^3(u) \ H_2^3(u) \ H_3^3(u)] \quad (6)$$

$$\begin{bmatrix} S(0,0) & S_v(0,0) & S_v(0,1) & S(0,1) \\ S_u(0,0) & S_{uv}(0,0) & S_{uv}(0,1) & S_u(0,1) \\ S_u(1,0) & S_{uv}(1,0) & S_{uv}(1,1) & S_u(1,1) \\ S(1,0) & S_v(1,0) & S_v(1,1) & S(1,1) \end{bmatrix} \begin{bmatrix} H_0^3(v) \\ H_1^3(v) \\ H_2^3(v) \\ H_3^3(v) \end{bmatrix}$$

where $$S_u(u, v) = \frac{\partial}{\partial u} S(u, v) \quad (7a)$$

$$S_v(u, v) = \frac{\partial}{\partial v} S(u, v) \quad (7b)$$

$$S_{uv}(u, v) = \frac{\partial^2}{\partial u \partial v} S(u, v) \quad (7c)$$

That is, $S_u(u, v)$ represents the tangent vector in the u direction at (u, v), and $S_v(u, v)$ represents the tangent vector in the v direction at (u, v). Also, $S_{uv}(u, v)$ is called a twist vector at (u, v), and represents the way the surface twists at that position.

Note that the surface generation directions $v_{1a}$ to $v_{4a}$ and $v_{1b}$ to $v_{4b}$ specified for the respective vertices $25_1$ to $25_4$ of the segment 24 correspond to the directions of tangent vectors $S_u(u, v)$ and $S_v(u, v)$ in the u and v directions. Also, the directions of the normal vectors $v_{n1}$ to $v_{n4}$ at the respective vertices $25_1$ to $25_4$ correspond to the directions of twist vectors $S_{uv}(u, v)$.

In this manner, using equation (6) that describes the Coons bi-cubic surface, the surface shape of the surface to be assigned to the segment 24 can be easily determined.

The rendering unit 54 instructs the display unit 52 to display the surface calculated by the surface calculation unit 58. The display unit 52 displays this surface S, as shown in FIG. 7, in accordance with the instruction from the rendering unit 54 (second rendering step: step S150). In this manner, the designer can confirm the generated surface S.

The rendering unit 54 checks if generation of surfaces as reflecting surface elements 14 is complete for all the plurality of segments 24 (step S160). If generation of surfaces is not complete yet for all the segments 24, the flow returns to step S120 to generate surfaces as reflecting surface elements 14 to be assigned to the remaining segments 24. Upon completion of generation of surfaces for all the segments 24, design of the reflecting surface 10*a* ends.

FIGS. 13A and 13B show the sections of the reflecting surface 10*a*, which is designed in this way. FIG. 13A shows the reflecting surface 10*a* generated when common vertices of neighboring segments 24 have identical reflecting directions upon determining the light reflecting directions at the respective vertices $25_1$ to $25_4$ of each segment 24. FIG. 13B shows the reflecting surface 10*a* generated when common vertices of neighboring segments 24 have different reflecting directions.

When identical reflecting directions are set, the boundaries between reflecting surface elements 14 of neighboring segments 24 become continuous, and a smooth reflecting surface 10*a* as a whole can be obtained, as shown in FIG. 13A. On the other hand, when different reflecting directions are set, the boundaries between reflecting surface elements 14 of neighboring segments 24 become discontinuous, and a discontinuous reflecting surface 10*a* as a whole can be obtained, as shown in FIG. 13B.

The hardware arrangement used in the aforementioned reflecting surface design system 50 will be explained below.

Figure 14:
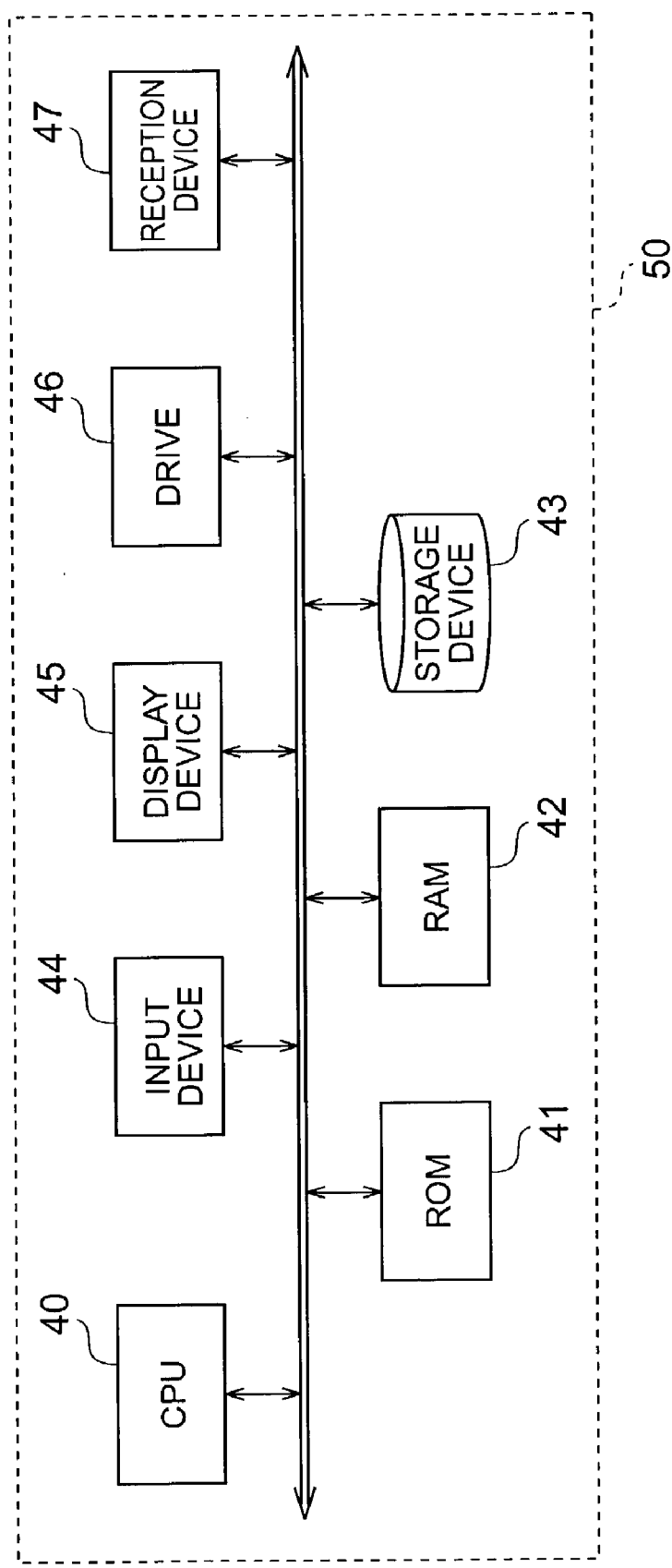
FIG. 14 is a block diagram showing an example of the hardware arrangement of the reflecting surface design system shown in FIG. 3.

FIG. 14 is a block diagram showing an example of the hardware arrangement used in the reflecting surface design system 50 shown in FIG. 3. A CPU 40 implements software functions such as acceptance and processes of inputs at the reflection information specifying unit 56, generation of surfaces by the surface calculation unit 58, generation of various windows and display instructions to the display unit 52 by the rendering unit 54, and the like in the reflecting surface design system 50.

To the CPU 40, a ROM 41 that stores software programs and the like required to execute processing operations of this system 50, and a RAM 42 that temporarily stores data upon execution of the program are connected. Also, an external storage device 43 such as a hard disk or the like is connected, and is used to hold data such as input data and the like.

To the CPU 40 and the like, an input device 44 used to input data (e.g., selection of a straight line) to the reflection information specifying unit (56 in FIG. 3), and a display device 45 corresponding to the display unit (52 in FIG. 3) are connected to form the reflecting surface design system 50 of this embodiment. As the input device 44, a pointing device such as a mouse or the like, a keyboard, and the like are used. As the display device 45, a CRT display, liquid crystal display, or the like is used.

A reflecting surface design program that implements respective processes to be executed by the CPU 40 can be distributed while being recorded on a computer readable recording medium. Such recording medium includes magnetic media such as a hard disk, floppy disk, and the like, optical media such as a CD-ROM, DVD-ROM, and the like, magnetooptical media such as a floptical disk and the like, and hardware devices such as a RAM, ROM, semiconductor nonvolatile memory, and the like, which are specially equipped to execute or store program commands. In order to load or execute the program from such recording medium, a recording medium read drive (e.g., a floppy disk drive or the like) 46 used to read a program or the like from a recording medium may be connected to the CPU 40 as needed, as shown in FIG. 14.

Also, a reflecting surface design program that implements respective processes to be executed by the CPU 40 can be distributed via a communication line such as the Internet or the like. Hence, in order to load or execute a program distributed via the communication line, a reception device 47 that receives a program or the like from the communication line may be connected to the CPU 40 as needed, as shown in FIG. 14.

In this embodiment, a surface to be assigned to one segment can be generated on the basis of the vertex positions and light reflecting directions of that segment, and the light source direction. That is, the light reflecting direction at each vertex of the segment can be set in a desired direction, and a surface can be generated to reflect light in that direction. Hence, the designer can control the directions of light reflected by the surface to be generated to fall within a desired range by controlling the light reflecting direction at each vertex of the segment to agree with a desired direction. As a result, the controllability of a light distribution pattern can be improved. Also, since a surface to be assigned to a given segment can be generated by specifying only the vertex positions and light reflecting directions at respective vertices of that segment, the design process efficiency can be improved.

By selecting one of straight lines, which respectively extend from a plurality of vertices that define one segment in predetermined directions, the vertex position and light reflecting direction at one vertex can be specified. In this manner, when the designer selects one straight line, the vertex position and light reflecting direction can be specified, and a surface can be generated based on them. Therefore, the design process efficiency can be further improved.

Also, since the already selected straight line of those which respectively extend from a plurality of vertices that define one segment in predetermined directions can be displayed to be distinguished from straight lines which have not been selected yet, the designer can easily recognize straight lines which have not been selected yet, thus further improving the design process efficiency.

(Second Embodiment)

The second embodiment of the present invention will be described below. Note that the same reference numerals in the second embodiment denote the same elements as those in the first embodiment, and a repetitive description thereof will be avoided.

Figure 15:
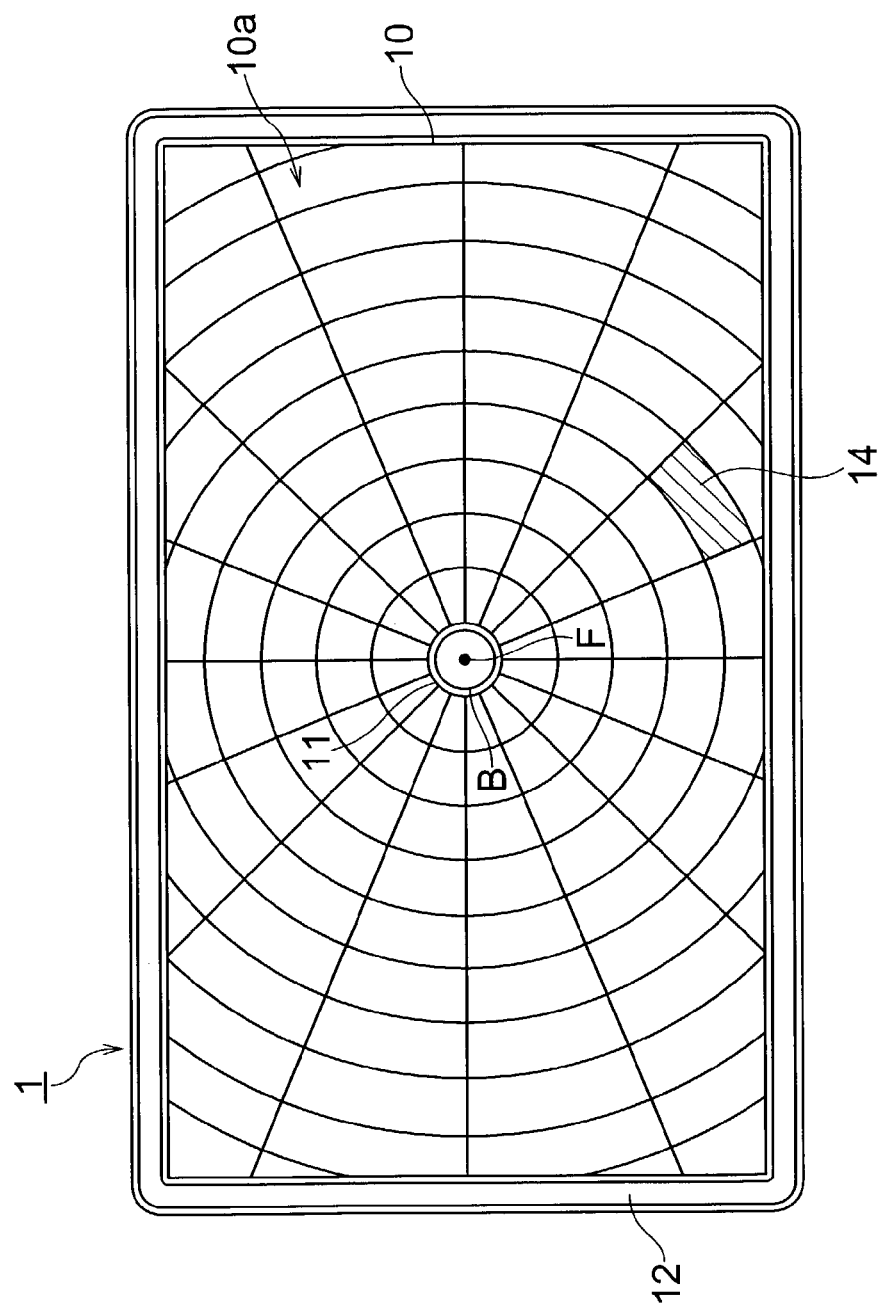
FIG. 15 is a plan view showing another example of the arrangement of a reflecting mirror of a lamp member for a vehicle.

In the first embodiment, the design process of the reflecting surface 10a when each segment 24 of the free-form surface 20 has a rectangular shape has been explained. However, the shape of each segment 24 of the free-form surface 20 is not limited to the rectangular shape described in the above embodiment. FIG. 15 is a plan view showing another arrangement of the reflecting mirror 1 of the lamp member for a vehicle.

In this example, the reflecting surface 10a is formed by assigning a plurality of reflecting surface elements 14 to segments 24, which are obtained by radially dividing the free-form surface 20 as the basic shape of the reflecting surface 10a, as shown in FIG. 15. In FIG. 15, one reflecting surface element 14 is hatched to clarify its range. In this example, the coordinate axes of an Xrθ system are defined, so that the X-axis agrees with the back-and-forth direction as the direction of the optical axis Ax of the lamp member, the r-axis agrees with the radial direction having an intersection with the optical axis Ax as the center, and the θ-axis agrees with the concentric circumferential direction having the intersection as the center.

The reflecting surface 10a has a structure obtained by dividing it into segments at given pitches in the orthogonal r- and θ-axis directions, so that the shapes of respective segments 24 corresponding to individual reflecting surface elements 14 have fan shapes when viewed from the X-axis direction.

In the second embodiment, the design process of the reflecting surface 10a when each segment 24 of the free-form surface 20 has a fan shape, as described above, will be explained.

A reflecting surface design system 50 according to the second embodiment comprises a display unit 52, rendering unit 54, reflection information specifying unit 56, and surface calculation unit 58, as shown in FIG. 3, as in the reflecting surface design system 50 according to the first embodiment. The arrangements of the display unit 52 and surface calculation unit 58 are the same as those in the reflecting surface design system 50 according to the first embodiment.

Figure 16:
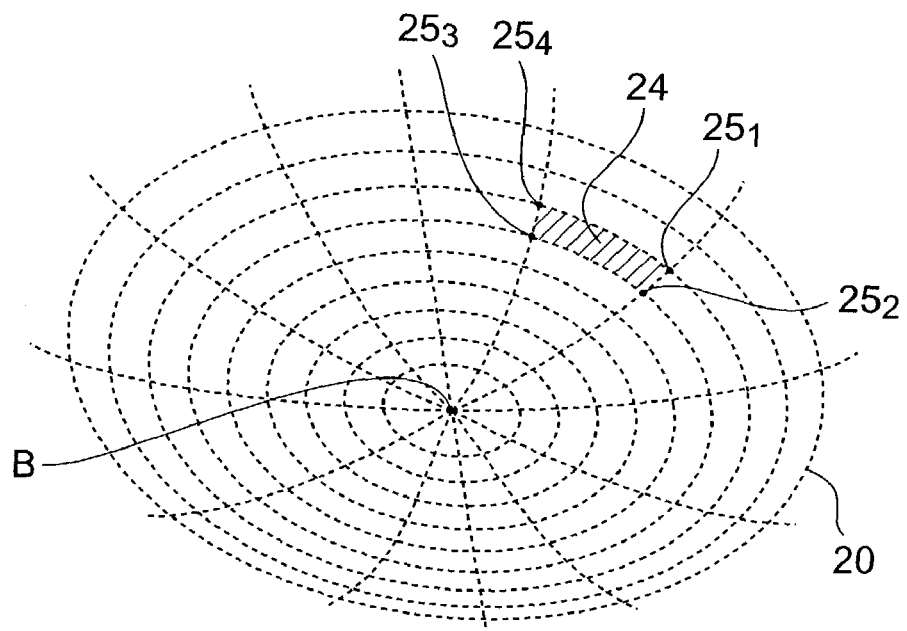
FIG. 16 shows a free-form surface used upon designing a reflecting surface in the second and third embodiments.

The rendering unit 54 instructs the display unit 52 to display the free-form surface 20 (first rendering means). The display unit 52 displays the free-form surface 20, as shown in FIG. 16, in accordance with the instruction from the rendering unit 54. This free-form surface 20 defines the basic shape of the reflecting surface 10a, as described above, and an actual surface shape of the reflecting surface 10a is determined based on this surface.

As shown in FIG. 16, this free-form surface 20 is divided into a plurality of segments 24 by a plurality of boundary lines. Hence, each segment 24 is defined by a plurality of vertices $25_1$ to $25_4$ (four vertices in FIG. 16) as intersections of the boundary lines. This free-form surface 20 is generated in the Xrθ space, has the light source point F (light source position) of the light source bulb B as an origin, and has the radial and circumferential directions which respectively agree with the r- and θ-axis directions.

Figure 17A:
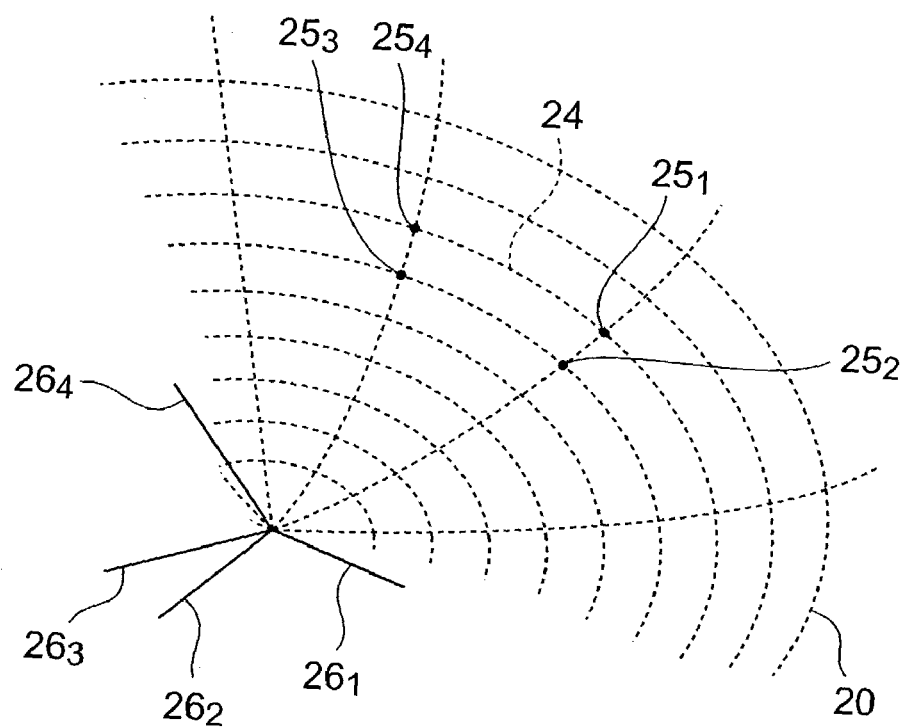
FIG. 17A is a view showing a free-form surface, and straight lines which represent the light reflecting directions at respective vertices that define one segment of the free-form surface.
Figure 17B:
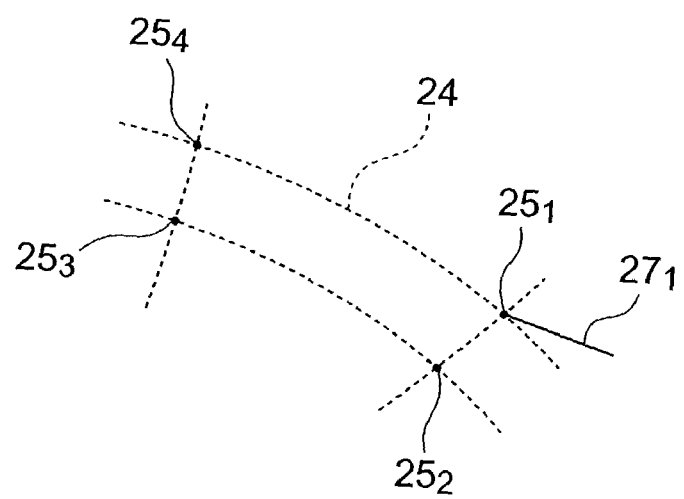
FIG. 17B is a view showing the display state of a straight line extending in the light reflecting direction at an already selected vertex upon designing a reflecting surface in the second embodiment.

The rendering unit 54 instructs the display unit 52 to display straight lines $26_1$ to $26_4$, which extend in predetermined directions from a predetermined position in the space that includes the free-form surface 20 (fourth rendering means). In this case, these straight lines $26_1$ to $26_4$ extend from the origin as the light source point F of the light source bulb B. The display unit 52 displays these straight lines $26_1$ to $26_4$, as shown in FIGS. 17A and 17B, in accordance with the instruction from the rendering unit 54. These straight lines $26_1$ to $26_4$ are generated by the designer for one segment 24 for which a reflecting surface element 14 is to be formed. The extending directions of these straight lines $26_1$ to $26_4$ indicate the reflecting directions of light, which comes from the light source bulb B and is reflected at the vertices $25_1$ to $25_4$ of that segment 24. Note that the rendering unit 54 may change the colors of these straight lines $26_1$ to $26_4$ upon display.

The reflection information specifying unit 56 has a vertex position specifying unit 60 and reflecting direction specifying unit 62, as shown in FIG. 3. The reflection information specifying unit 56 accepts one vertex selected by the designer from the plurality of vertices $25_1$ to $25_4$ that define one segment displayed on the display unit 52. The reflection information specifying unit 56 also accepts one straight line selected by the designer from the plurality of straight lines $26_1$ to $26_4$ displayed on the display unit 52. The vertex position specifying unit 60 specifies, as a coordinate position, the vertex position of the selected vertex on the basis of data saved in the rendering unit 54. The reflecting direction specifying unit 62 specifies, as a vector, the extending direction of this straight line on the basis of data saved in the rendering unit 54, and specifies this direction as the light reflecting direction at that vertex.

Figure 18:
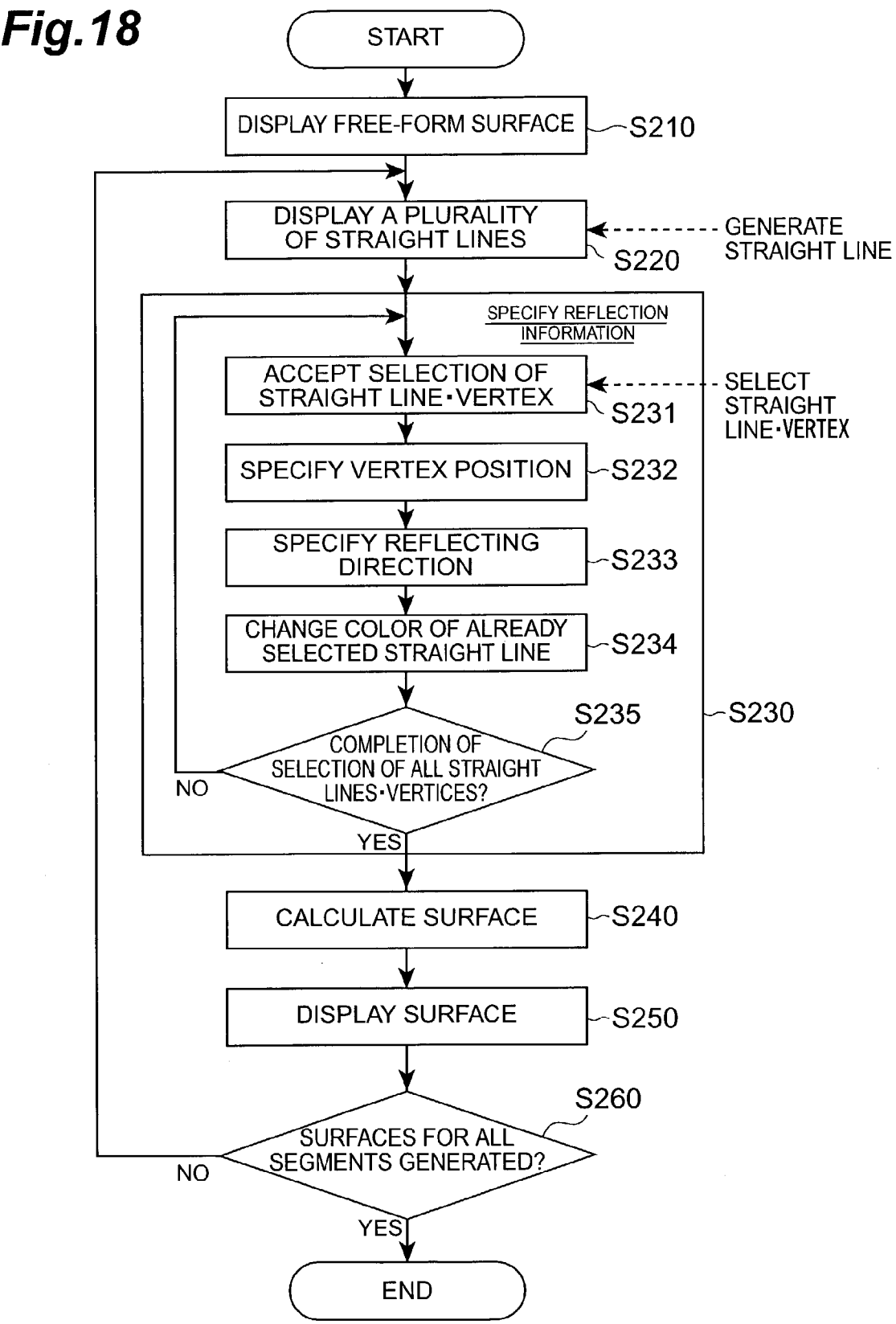
FIG. 18 is a flow chart for explaining a reflecting surface design method according to the second embodiment.

The reflecting surface design method according to this embodiment using the reflecting surface design system 50 with the above arrangement will be described below with reference to the flow chart shown in FIG. 18. Note that the flow chart in FIG. 18 shows the flow of processes in the reflecting surface design system 50, and designer's actions are indicated by the broken arrows on the right side of the flow.

In the reflecting surface design method according to this embodiment, the method of inputting reflection information by the designer is different from that according to the first embodiment, and the processing method in the reflecting surface design system 50 differs accordingly.

The rendering unit 54 instructs the display unit 52 to display the free-form surface 20. The display unit 52 displays the free-form surface 20, as shown in FIG. 16, in accordance with the instruction from the rendering unit 54 (first rendering step: step S210). The designer determines one segment 24 used to form a reflecting surface element 14, from a plurality of segments 24 of the free-form surface 20 displayed on the display unit 52. Then, the designer generates straight lines $26_1$ to $26_4$, which extend in predetermined directions from the origin as the position of the light source bulb B. These straight lines $26_1$ to $26_4$ indicate the reflecting directions of light, which comes from the light source bulb B and is reflected at respective vertices $25_1$ to $25_4$ of one segment 24. The rendering unit 54 instructs the display unit 52 to display these straight lines $26_1$ to $26_4$ generated by the designer. The display unit 52 displays these straight lines $26_1$ to $26_4$, as shown in FIGS. 17A and 17B, in accordance with the instruction from the rendering unit 54 (fourth rendering step: step S220).

The designer selects one vertex $25_1$ by clicking it from the plurality of vertices $25_1$ to $25_4$ of the segment 24 displayed on the display unit 52. In response to this selection, the reflection information specifying unit 56 accepts the vertex $25_1$ selected by the designer (step S231). Also, the designer selects one straight line $26_1$ by clicking it from the plurality of straight lines $26_1$ to $26_4$ displayed on the display unit 52. In response to this selection, the reflection information specifying unit 56 accepts the straight line $26_1$ selected by the designer (step S231).

The vertex position specifying unit 60 specifies, as a coordinate position, the vertex position of the vertex $25_1$ on the basis of data saved in the rendering unit 54 (step S232). Also, the reflecting direction specifying unit 62 specifies, as a vector, the extending direction of this straight line $26_1$ on the basis of data saved in the rendering unit 54, and specifies this direction as the light reflecting direction at one vertex $25_1$ (step S233). The rendering unit 54 instructs the display unit 52 to change the color of the selected straight line $26_1$ and to display it to be distinguished from straight lines $26_2$ to $26_4$, which have not been selected yet (step S234). Note that the method of distinguishing the already selected straight line from non-selected straight lines is not limited to the method of changing the color. For example, the already selected straight line may be displayed to be bolder than non-selected straight lines or may be displayed as a broken line or arrow. The rendering unit 54 may generate a straight line $27_1$, which extends from the selected vertex $25_1$ in the extending direction of the selected straight line $26_1$, and may instruct the display unit 52 to display the generated line, as shown in FIG. 17B. In this way, the already selected vertex $25_1$ can be distinguished from non-selected vertices $25_2$ to $25_4$.

The reflection information specifying unit 56 checks if selection of all of the plurality of vertices $25_1$ to $25_4$ and the plurality of straight lines $26_1$ to $26_4$ is complete (step S235). If selection of all of the plurality of vertices $25_1$ to $25_4$ and the plurality of straight lines $26_1$ to $26_4$ is not complete yet, the flow returns to step S231 to accept selection of the remaining vertices $25_2$ to $25_4$ and straight lines $26_2$ to $26_4$, and to specify the vertex positions and light reflecting directions of the remaining vertices $25_2$ to $25_4$. Upon completion of selection of all of the plurality of vertices $25_1$ to $25_4$ and the plurality of straight lines $26_1$ to $26_4$, the flow advances to step S240.

In this manner, the designer repetitively selects one vertex and one straight line from the plurality of vertices $25_1$ to $25_4$ and the plurality of straight lines $26_1$ to $26_4$ displayed on the display unit 52. In response to the selection, the reflection information specifying unit 56 specifies the vertex positions and light reflecting directions of all the plurality of vertices $25_1$ to $25_4$ that define the segment 24 (reflection information specifying step: step S230).

The surface calculation unit 58 receives the vertex positions and light reflecting directions of the plurality of vertices $25_1$ to $25_4$ that define one segment 24 from the reflection information specifying unit 56. Also, the unit 58 specifies, as a coordinate position, the light source position of the light source bulb B on the basis of data saved in the rendering unit 54. The unit 58 then calculates a surface to be assigned to that segment 24 on the basis of the vertex positions and light reflecting directions of the plurality of vertices $25_1$ to $25_4$ that define the segment 24 and the light source position (surface calculation step: step S240). The surface calculated in this manner is used as the surface shape of the reflecting surface element 14 to be assigned to that segment 24.

The method of generating a surface in the surface calculation unit 58 will be described in detail below.

On the basis of the light reflecting directions at the vertices $25_1$ to $25_4$ of the segment 24 specified in the reflection information specifying step, two each independent surface generation directions $v_{1a}$ to $v_{4a}$ and $v_{1b}$ to $v_{4b}$ at the vertices $25_1$ to $25_4$, which are used to generate a surface to be assigned to that segment 24, are specified. These surface generation directions are uniquely determined if the light reflecting directions at the vertices $25_1$ to $25_4$ are specified. The surface generation directions are specified as follows.

Figure 19A:
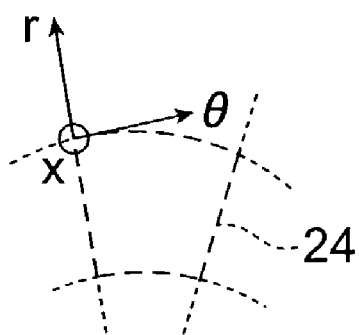
FIG. 19A shows a setting example of a coordinate system for a fan-shaped segment.
Figure 19B:
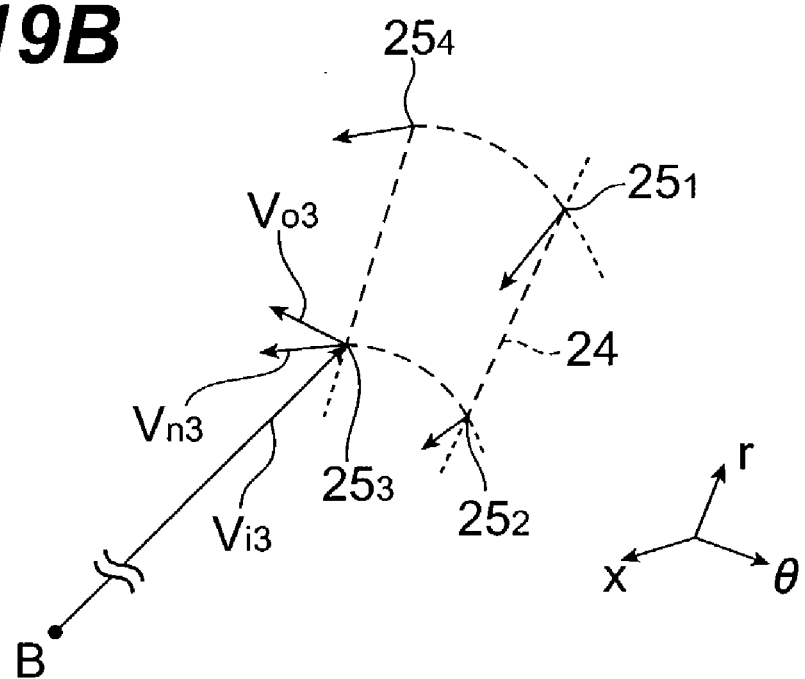
FIG. 19B is a view for explaining a method of determining surface generation directions at respective vertices upon segmenting a free-form surface by fan-shaped segments.

In this embodiment, since each segment 24 of the free-form surface 20 has a fan shape, the Xrθ coordinate system defined by the optical axis direction X, radial direction r, and circumferential direction θ is set, as shown in FIG. 19A. As shown in FIG. 19B, a normal vector $v_{n3}$ to a reflecting plane that reflects light from the light source bulb B in the reflecting direction at the vertex $25_3$ is calculated. This normal vector $v_{n3}$ can be calculated by:

$$v_{n3}=(v_{o3}-v_{i3})/2 \qquad (8)$$

Subsequently, a vector $v_{3a}$, which is perpendicular to the normal vector $v_{n3}$ and also to the r-axis, is calculated. This vector $v_{3a}$ can be calculated by:

$$v_{3a}=v_{n3} \times v_r \qquad (9)$$

where $v_r$ is a normal vector to a plane perpendicular to the r-axis.

Furthermore, a vector $v_{3b}$, which is perpendicular to the normal vector $v_{n3}$ and also to the θ-axis, is calculated. This vector $v_{3b}$ can be calculated by:

$$v_{3b}=v_{n3} \times v_\theta \qquad (10)$$

where $v_\theta$ is a normal vector to a plane perpendicular to the θ-axis.

The directions of the vectors $v_{3a}$ and $v_{3b}$ calculated in this way are specified as the surface generation directions at the vertex $25_3$, which are used to generate a surface to be assigned to the segment 24. The same processes are repeated for other vertices $25_1$, $25_2$, and $25_4$. In this manner, the surface generation directions $v_{1a}$ to $v_{4a}$ and $v_{1b}$ to $v_{4b}$ at all the vertices $25_1$ to $25_4$ are determined.

Then, the surface shape of a surface to be assigned to that segment 24 is determined on the basis of the surface generation directions specified for the vertices $25_1$ to $25_4$ of the segment 24, and the vertex positions of the vertices. Note that the surface shape is determined by the same method as that described in the first embodiment.

Figure 20:
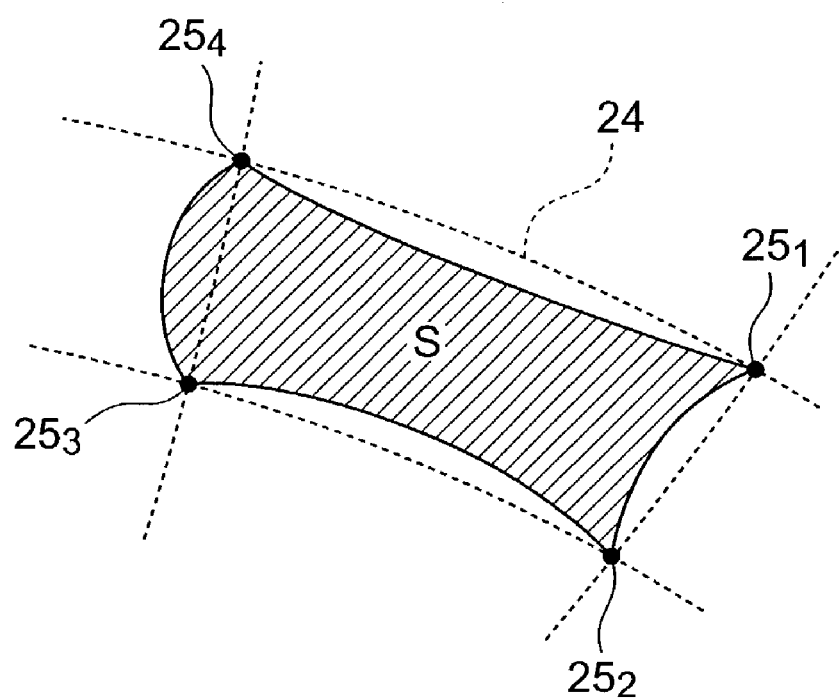
FIG. 20 shows a view showing a process for generating a surface as a reflecting surface element on one segment in the second and third embodiments.

The rendering unit 54 instructs the display unit 52 to display a surface calculated by the surface calculation unit 58. The display unit 52 displays a surface S, as shown in FIG. 20, in accordance with the instruction from the rendering unit 54 (second rendering step: step S250). In this manner, the designer can confirm the generated surface S.

The rendering unit 54 checks if generation of surfaces as reflecting surface elements 14 is complete for all the plurality of segments 24 (step S260). If generation of surfaces is not complete yet for all the segments 24, the flow returns to step S220 to generate surfaces as reflecting surface elements 14 to be assigned to the remaining segments 24. Upon completion of generation of surfaces for all the segments 24, design of the reflecting surface 10a ends.

In this embodiment as well, a surface to be assigned to one segment can be generated on the basis of the vertex positions and light reflecting directions of that segment, and the light source direction. That is, the light reflecting direction at each vertex of the segment can be set in a desired direction, and a surface can be generated to reflect light in that direction. Hence, the designer can control the directions of light reflected by the surface to be generated to fall within a desired range by controlling the light reflecting direction at each vertex of the segment to agree with a desired direction. As a result, the controllability of a light distribution pattern can be improved. Also, since a surface to be assigned to a given segment can be generated by specifying only the vertex positions and light reflecting directions at respective vertices of that segment, the design process efficiency can be improved.

By selecting one of a plurality of vertices that define one segment, the vertex position of the selected vertex can be specified. By selecting one of straight lines, which respectively extend from the coordinate origin in predetermined directions, the light reflecting direction at that vertex can be specified. In this manner, when the designer selects the vertex and straight line, the vertex position and light reflecting direction can be specified, and a surface can be generated based on them. Therefore, the design process efficiency can be further improved.

Especially, when the plurality of straight lines used to specify the light reflecting directions are displayed to extend from a specific position (e.g., the coordinate origin), if a plurality of segments have identical light reflecting directions at respective vertices, a surface can be generated by sharing a plurality of straight lines among a plurality of segments, thus further improving the design process efficiency.

Also, since the already selected straight line of those which respectively extend from the coordinate origin in predetermined directions can be displayed to be distinguished from straight lines which have not been selected yet, the designer can easily recognize straight lines which have not been selected yet, thus further improving the design process efficiency.

(Third Embodiment)

The third embodiment of the present invention will be described below. Note that the same reference numerals in the third embodiment denote the same elements as those in the first and second embodiments, and a repetitive description thereof will be avoided.

In the third embodiment, the design process of the reflecting surface 10a when each segment 24 of the free-form surface 20 has a fan shape, as in the second embodiment, will be explained. A reflecting surface design system 50 according to the second embodiment comprises the display unit 52, rendering unit 54, reflection information specifying unit 56, and surface calculation unit 58, as shown in FIG. 3, as in the reflecting surface design system 50 according to the second embodiment. The arrangements of the display unit 52 and surface calculation unit 58 are the same as those in the reflecting surface design system 50 according to the first embodiment.

The rendering unit 54 instructs the display unit 52 to display the free-form surface 20 (first rendering means). The display unit 52 displays the free-form surface 20 in accordance with the instruction from the rendering unit 54. The free-form surface 20 is displayed in the same manner as in FIG. 16. This free-form surface 20 defines the basic shape of the reflecting surface 10a, as described above, and an actual surface shape of the reflecting surface 10a is determined based on this surface.

The rendering unit 54 instructs the display unit 52 to display an angle input window 70 that prompts the designer to input angle information (fifth rendering means). This angle information is used to specify light reflecting directions at a plurality of vertices $25_1$ to $25_4$ that define one segment 24. The display unit 52 displays the angle input window 70, as shown in FIG. 21, in accordance with the instruction from the rendering unit 54.

As shown in FIG. 21, the angle input window 70 has boxes 71 to 74 that make the designer input angle information for specifying light reflecting directions at the vertices $25_1$ to $25_4$ of the segment 24. The boxes 71 to 74 are provided in correspondence with the vertices $25_1$ to $25_4$ of the segment 24. Two boxes are prepared per vertex, and the light reflecting direction at one vertex is specified by angles in two independent directions.

For example, when a segment 24 has a fan shape, the angles it makes with the axis in the radial direction (r-axis in FIGS. 19A and 19B) are input to upper ones of the boxes 71 to 74. Also, the angles it makes with the axis in the circumferential direction (θ-axis in FIGS. 19A and 19B) are input to lower ones of the boxes 71 to 74. When a segment 24 has a rectangular shape, the angles it makes with the axis in the horizontal direction (Y-axis in FIG. 4) are input to upper ones of the boxes 71 to 74. Also, the angles it makes with the axis in the vertical direction (Z-axis in FIG. 4) are input to lower ones of the boxes 71 to 74. In this embodiment, since one rotational direction with respect to a given axis is defined as a positive direction, and another rotational direction opposite to that rotational direction is defined as a negative direction, angles are input to the boxes 71 to 74 using positive and negative values. Also, the angle input window 70 has a box 75 for inputting the type of shape of each segment 24 of the free-form surface 20. Note that the angle input window 70 shown in FIG. 21 is merely an example, and the window configuration and the like are not limited to such specific window.

These pieces of angle information are input by the designer for one segment 24 for which a reflecting surface element 14 is to be formed. Directions specified based on these pieces of angle information indicate the reflecting directions of light, which comes from the light source bulb B and are reflected at respective vertices $25_1$ to $25_4$ of that segment 24. Note that the rendering unit 54 can display straight lines $28_1$ to $28_4$ extending in the directions specified based on these pieces of angle information at the vertices $25_1$ to $25_4$.

The reflection information specifying unit 56 has a vertex position specifying unit 60 and reflecting direction specifying unit 62, as shown in FIG. 3. The reflection information specifying unit 56 accepts the angle information input by the designer via the angle input window 70. Also, the reflection information specifying unit 56 accepts one vertex $25_1$ selected by the designer from the plurality of vertices $25_1$ to $25_4$ that define one segment 24 of the free-form surface 20 displayed on the display unit 52. The vertex position specifying unit 60 specifies, as a coordinate position, the vertex position of the selected vertex on the basis of data saved in the rendering unit 54. The reflecting direction specifying unit 62 specifies, as a vector, the light reflecting direction at that vertex $25_1$ on the basis of the angle information input by the designer.

Figure 22:
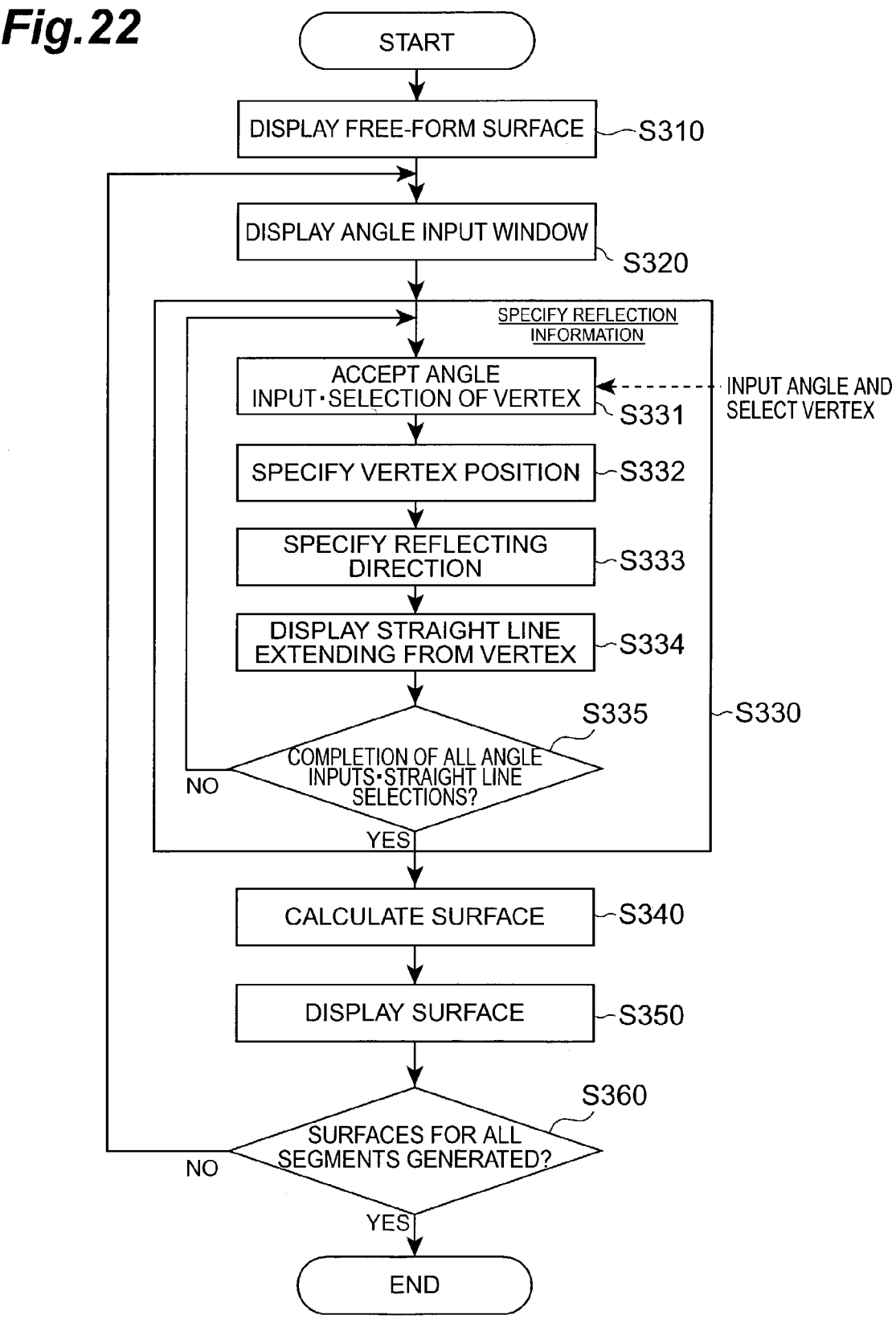
FIG. 22 is a flow chart for explaining a reflecting surface design method according to the third embodiment.

The reflecting surface design method according to this embodiment using the reflecting surface design system 50 with the above arrangement will be described below with reference to the flow chart shown in FIG. 22. Note that the flow chart in FIG. 22 shows the flow of processes in the reflecting surface design system 50, and designer's actions are indicated by the broken arrows on the right side of the flow.

In the reflecting surface design method according to this embodiment, the method of inputting reflection information by the designer is different from that according to the first and second embodiments, and the processing method in the reflecting surface design system 50 differs accordingly.

The rendering unit 54 instructs the display unit 52 to display the free-form surface 20. The display unit 52 displays the free-form surface 20, as shown in FIG. 16, in accordance with the instruction from the rendering unit 54 (first rendering step: step S310).

The rendering unit 54 instructs the display unit 52 to display the angle input window 70 that prompts the designer to input angle information. The display unit 52 displays the angle input window 70, as shown in FIG. 21, in accordance with the instruction from the rendering unit 54 (fifth rendering step: step S320). Angle information input via this angle input window 70 is used to specify the light reflecting direction at each of the plurality of vertices $25_1$ to $25_4$ that define one segment 24.

The designer determines one segment 24 used to form a reflecting surface element 14, from a plurality of segments 24 of the free-form surface 20 displayed on the display unit 52. Then, the designer inputs angle information used to specify the light reflecting directions at the respective vertices $25_1$ to $25_4$ that define the determined segment 24. The reflection information specifying unit 56 accepts angle information input by the designer via the angle input window 70 (step S331). The designer selects one vertex $25_1$ by clicking it from the plurality of vertices $25_1$ to $25_4$ of the segment 24 displayed on the display unit 52. In response to this selection, the reflection information specifying unit 56 accepts the vertex $25_1$ selected by the designer (step S331).

Figure 23:
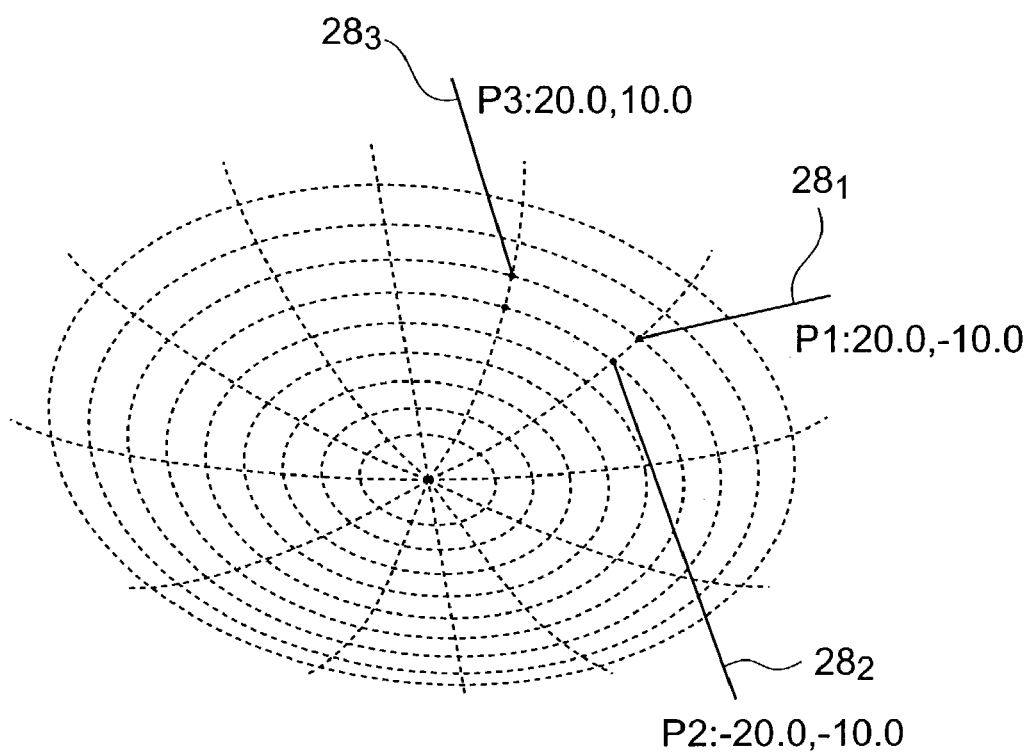
FIG. 23 shows the display state of a straight line that extends in the light reflecting direction at an already selected vertex and angle information upon designing a reflecting surface in the third embodiment.

The vertex position specifying unit 60 specifies, as a coordinate position, the vertex position of the vertex $25_1$ on the basis of data saved in the rendering unit 54 (step S332). Also, the reflecting direction specifying unit 62 specifies, as a vector, the light reflecting direction at the vertex $25_1$ on the basis of the angle information input by the designer (step S333). Note that the rendering unit 54 may generate a straight line $28_1$ which extends in the light reflecting direction specified by the reflecting direction specifying unit 62 for the selected vertex $25_1$, and may instruct the display unit 52 to display this straight line $28_1$ and corresponding angle information, as shown in FIG. 23. In this manner, the already selected vertex $25_1$ can be distinguished from vertices $25_2$ to $25_4$, which have not been selected yet.

The reflection information specifying unit 56 checks if selection of all the plurality of vertices $25_1$ to $25_4$ is complete (step S335). If selection of all the plurality of vertices $25_1$ to $25_4$ is not complete yet, the flow returns to step S331 to accept selection of the remaining vertices $25_2$ to $25_4$, and to specify the vertex positions and light reflecting directions of the remaining vertices $25_2$ to $25_4$. Upon completion of selection of all the plurality of vertices $25_1$ to $25_4$, the flow advances to step S340.

In this manner, the designer repetitively selects one vertex from the plurality of vertices $25_1$ to $25_4$ that define one segment 24 of the free-form surface 20 displayed on the display unit 52. In response to the selection, the reflection information specifying unit 56 specifies the vertex positions and light reflecting directions of all the plurality of vertices $25_1$ to $25_4$ that define the segment 24 (reflection information specifying step: step S330).

The surface calculation unit 58 receives the vertex positions and light reflecting directions of the plurality of vertices $25_1$ to $25_4$ that define one segment 24 from the reflection information specifying unit 56. Also, the unit 58 specifies, as a coordinate position, the light source position of the light source bulb B on the basis of data saved in the rendering unit 54. The unit 58 then calculates a surface to be assigned to that segment 24 on the basis of the vertex positions and light reflecting directions of the plurality of vertices $25_1$ to $25_4$ that define the segment 24 and the light source position (surface calculation step: step S340). The surface calculated in this manner is used as the surface shape of the reflecting surface element 14 to be assigned to that segment 24. Note that the surface generation method in the surface calculation unit 58 is the same as that described in the second embodiment.

The rendering unit 54 instructs the display unit 52 to display a surface S calculated by the surface calculation unit 58. The display unit 52 displays the surface S, as shown in FIG. 20, in accordance with the instruction from the rendering unit 54 (second rendering step: step S350). In this manner, the designer can confirm the generated surface S.

The rendering unit 54 checks if generation of surfaces S as reflecting surface elements 14 is complete for all the plurality of segments 24 (step S360). If generation of surfaces S is not complete yet for all the segments 24, the flow returns to step S320 to generate surfaces S as reflecting surface elements 14 to be assigned to the remaining segments 24. Upon completion of generation of surfaces S for all the segments 24, design of the reflecting surface 10*a* ends.

In this embodiment as well, a surface to be assigned to one segment can be generated on the basis of the vertex positions and light reflecting directions of that segment, and the light source direction. That is, the light reflecting direction at each vertex of the segment can be set in a desired direction, and a surface can be generated to reflect light in that direction. Hence, the designer can control the directions of light reflected by the surface to be generated to fall within a desired range by controlling the light reflecting direction at each vertex of the segment to agree with a desired direction. As a result, the controllability of a light distribution pattern can be improved. Also, since a surface to be assigned to a given segment can be generated by specifying only the vertex positions and light reflecting directions at respective vertices of that segment, the design process efficiency can be improved.

By selecting one of a plurality of vertices that define one segment, the vertex position of the selected vertex can be specified. Based on angle information input via the angle input window, the light reflecting direction at that vertex can be specified. Therefore, when the designer selects a given vertex and inputs angle information, the vertex position and light reflecting direction can be specified, and a surface can be generated based on them. Hence, the design process efficiency can be further improved.

Note that the present invention is not limited to the aforementioned embodiments, and various changes and modifications may be made.

For example, ray tracing (a process for confirming the reflecting direction of light which is emitted by the light source bulb B toward the generated surface and is reflected by that surface) may be implemented by computer simulation.

The type of lamp member is not limited to a marker lamp. For example, the present invention can be applied to reflecting mirrors used in various other types of lamp members for a vehicle, or lamp members other than those for a vehicle.

As described above, according to the present invention, there are provided a reflecting surface design system and method for designing a reflecting surface of a reflecting mirror of a lamp member while improving the controllability of a light distribution pattern and the efficiency of design processes, a computer program for making a computer design a reflecting surface of a reflecting mirror of a lamp member, and a computer readable recording medium that records the computer program.

As can be seen from the description of the present invention, the present invention can be variously modified. Such modifications are not recognized as those departing from the spirit and scope of the present invention, and improvements which are known to those who are skilled in the art are included in the scope of the appended claims.

What is claimed is:

1. A reflecting surface design system for designing a reflecting surface of a reflecting mirror of a lamp member, comprising:
    first rendering means for displaying a free-form surface on which a plurality of segments, each of which is defined by a plurality of vertices, are formed;
    reflection information specifying means for specifying a vertex position and light reflecting direction for each of the plurality of vertices that define one of the plurality of segments, each segment comprising multiple vertices; and
    surface calculation means for calculating a surface to be assigned to the one segment on the basis of the vertex positions and light reflecting directions specified for the plurality of vertices that define the one segment, and a light source position, which is specified in advance;
    wherein values of the light reflecting direction at each of the vertices of a given segment are used to calculate a shape of a curved surface to replace the given segment.

2. A system according to claim 1, further comprising second rendering means for displaying the surface calculated by said surface calculation means.

3. A system according to claim 1, further comprising third rendering means for displaying straight lines which respectively extend from the plurality of vertices that define the one segment in a predetermined direction,
    wherein said reflection information specifying means specifies a start point position of one straight line selected from the plurality of straight lines as the vertex position of one vertex, and specifies an extending direction of the one straight line as the light reflecting direction at the one vertex.

4. A system according to claim 3, wherein said third rendering means displays an already selected straight line of the plurality of straight lines to be distinguished from straight lines, which have not been selected yet.

5. A system according to claim 1, further comprising fourth rendering means for displaying a plurality of straight lines which extend from a predetermined position in a space that includes the free-form surface in a predetermined direction,
    wherein said reflection information specifying means specifies the vertex position of one vertex selected from the plurality of vertices, and specifies an extending direction of one straight line selected from the plurality of straight lines as the light reflecting direction at the one vertex.

6. A system according to claim 5, wherein said fourth rendering means displays an already selected straight line of the plurality of straight lines to be distinguished from straight lines, which have not been selected yet.

7. A system according to claim 1, further comprising fifth rendering means for displaying an angle input window used to input angle information for specifying the light reflecting direction at each of the plurality of vertices,
    wherein said reflection information specifying means specifies the vertex position of one vertex selected from the plurality of vertices, and specifies the light reflecting direction at the one vertex on the basis of the angle information input for the one vertex.

8. A reflecting surface design method for designing a reflecting surface of a reflecting mirror of a lamp member, comprising:
    a first rendering step of displaying a free-form surface on which a plurality of segments, each of which is defined by a plurality of vertices, are formed;
    a reflection information specifying operation of specifying a vertex position and light reflecting direction for each of the plurality of vertices that define one of the plurality of segments; and
    a surface calculation step of calculating a surface to be assigned to the one segment on the basis of the vertex positions and light reflecting directions specified for the plurality of vertices that define the one segment, and a light source position, which is specified in advance;
    wherein the result of the surface calculation operation is stored in a memory.

9. A method according to claim 8, further comprising a second rendering operation of displaying the surface calculated in the surface calculation operation.

10. A method according to claim 8, furthercomprising a third rendering operation of displaying straight lines which respectively extend from the plurality of vertices that define the one segment in a predetermined direction, and
    wherein the reflection information specifying operation includes specifying a start point position of one straight line selected from the plurality of straight lines as the vertex position of one vertex, and specifying an extending direction of the one straight line as the light reflecting direction at the one vertex.

11. A method according to claim 10, wherein the third rendering operation includes displaying an already selected straight line of the plurality of straight lines to be distinguished from straight lines, which have not been selected yet.

12. A method according to claim 8, further comprising the fourth rendering operation of displaying a plurality of straight lines which extend from a predetermined position in a space that includes the free-form surface in a predetermined direction, and wherein the reflection information specifying operation includes specifying the vertex position of one vertex selected from the plurality of vertices, and specifying an extending direction of one straight line selected from the plurality of straight lines as the light reflecting direction at the one vertex.

13. A method according to claim 12, wherein the fourth rendering operation includes displaying an already selected straight line of the plurality of straight lines to be distinguished from straight lines, which have not been selected yet.

14. A method according to claim 8, further comprising the fifth rendering operation of displaying an angle input window used to input angle information for specifying the light reflecting direction at each of the plurality of vertices, wherein the reflection information specifying operation includes specifying the vertex position of one vertex selected from the plurality of vertices, and specifying the light reflecting direction at the one vertex on the basis of the angle information input for the one vertex.

15. A computer readable recording medium embodying a program for making a computer implement a method of claim 8.

16. A method according to claim 8, wherein multiple independent surface generation directions are defined for each of the plurality of vertices that define the one of the plurality of segments.

17. A method according to claim 8, wherein the surface is calculated by defining peripheral curves that connect the plurality of vertices that define the one of the plurality of segments using tangential spline curves or Hermite curves.

18. A method according to claim 8, wherein the free-form surface is a non-uniform shape.

* * * * *